US007873468B2

(12) United States Patent
Matsuura et al.

(10) Patent No.: US 7,873,468 B2
(45) Date of Patent: Jan. 18, 2011

(54) VEHICLE-MOUNTED APPARATUS

(75) Inventors: Masaki Matsuura, Iwaki (JP);
Nobuyuki Hirano, Iwaki (JP); Kou Torisawa, Matsudo (JP)

(73) Assignee: Alpine Electronics, Inc., Tokyo (JP)

( * ) Notice: Subject to any disclaimer, the term of this patent is extended or adjusted under 35 U.S.C. 154(b) by 1312 days.

(21) Appl. No.: 11/264,295

(22) Filed: Nov. 1, 2005

(65) Prior Publication Data
US 2006/0129636 A1 Jun. 15, 2006

(30) Foreign Application Priority Data

Nov. 4, 2004 (JP) ............................. 2004-320749
May 11, 2005 (JP) ............................. 2005-138058

(51) Int. Cl.
*G01C 21/32* (2006.01)
(52) U.S. Cl. ...................... 701/208; 701/200; 701/211; 340/995.1; 340/995.24; 340/995.27; 715/205
(58) Field of Classification Search ......... 701/200–224; 340/995.1–995.28; 705/14.5, 15.57, 14.58, 705/14.63, 14.64; 715/205, 207
See application file for complete search history.

(56) References Cited
U.S. PATENT DOCUMENTS 6,138,072 A * 10/2000 Nagai ........................ 701/207

6,363,392 B1 * 3/2002 Halstead et al. ................. 1/1
6,839,628 B1    1/2005 Tu
7,007,228 B1 * 2/2006 Carro ........................ 715/210
2003/0069029 A1 * 4/2003 Dowling et al. ............. 455/456
2005/0027705 A1 * 2/2005 Sadri et al. .................... 707/5

FOREIGN PATENT DOCUMENTS

| JP | 2002-297998 | 10/2002 |
| JP | 2003-269987 | 9/2003 |
| JP | 2003-302232 | 10/2003 |
| JP | 2004-030145 | 1/2004 |

* cited by examiner

*Primary Examiner*—Dalena Tran
*Assistant Examiner*—Spencer Patton
(74) *Attorney, Agent, or Firm*—Brinks Hofer Gilson & Lione

(57) ABSTRACT

The present invention provides a vehicle-mounted apparatus whereby a user can easily select and use a Web site in accordance with a point associated with information provided by the Web site and a description of the information. According to the present invention, a precache control unit automatically downloads at least one Web page of a Web site associated with each point matching a predetermined condition to a page cache memory and displays site icons at respective points corresponding to the downloaded Web sites on a map image. In addition, the precache control unit displays the predetermined type of extracted information by analyzing the description of the Web page of each Web site in an information window that pops up from the corresponding site icon. When the user selects one of the site icons, a Web browser displays the Web page of the Web site corresponding to the selected site icon.

19 Claims, 20 Drawing Sheets

POINT RECORD

0% ⟶ 100%

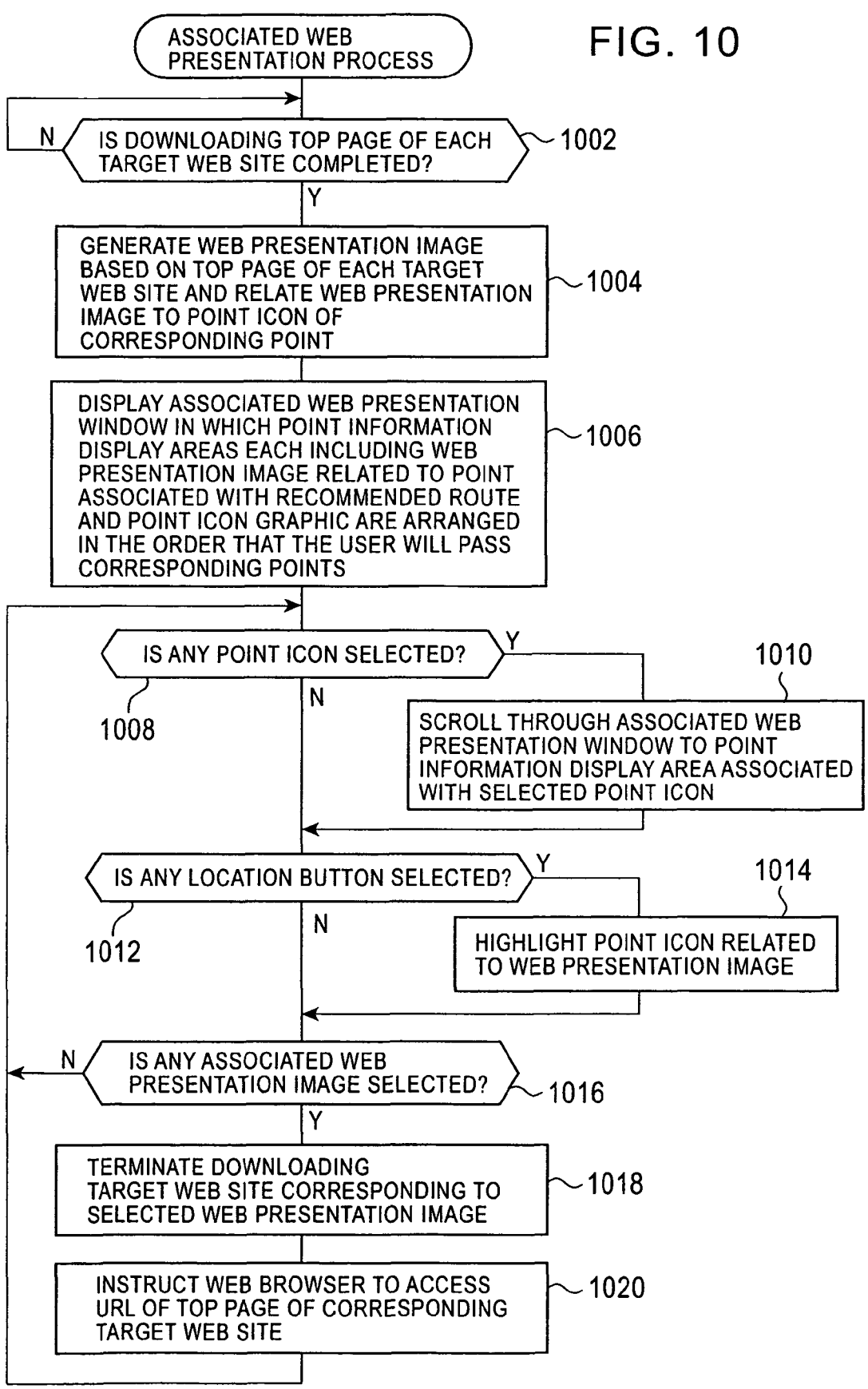

VEHICLE-MOUNTED APPARATUS

BACKGROUND OF THE INVENTION

1. Field of the Invention

The present invention relates to a technique for supporting a user in a vehicle to use a Web site.

2. Description of the Related Art

In some cases, an information terminal having a Web browser function of accessing a Web site on the Internet via wireless communication to browse Web pages of the Web site is mounted in a vehicle.

Japanese Unexamined Patent Application Publication No. 10-300490 discloses a known technique for supporting a user to use a Web site with the above-mentioned information terminal. According to the technique, a navigation system stores the coordinates of location points and URLs, each URL providing information regarding the corresponding point, on the Internet such that each URL is associated with the coordinates of the corresponding point. The navigation system automatically accesses the URL, associated with the coordinates of each point near a current vehicle position or a recommended guided route, to download information stored at the URL to a memory. In addition, marks representing the points associated with the respective URLs are displayed at the respective points specified by the coordinates associated with the URLs on a map, which is displayed to present the current vehicle position and the recommended route to the user. The display pattern of each mark is changed depending on whether information has already been downloaded from the corresponding URL to the memory. When the user selects one of the marks, information downloaded from the URL corresponding to the selected mark and stored in the memory is displayed.

General vehicle-mounted information terminals use a mobile phone network to access the Internet. The rate of data transfer via the mobile phone network is relatively low. Disadvantageously, it takes a long time to download information, such as a Web page, from a Web site over the Internet.

Accordingly, when the display pattern of each mark linked to the corresponding URL is changed depending on whether information has already been downloaded from the URL, it may take a long time until the display pattern of the mark is changed to another pattern indicating that the information has been downloaded. In addition, while the pattern of the mark is changed to another pattern indicating the completion of download, the user cannot know whether information is being normally downloaded from the corresponding URL. Since it may take a long time to download information from the URL associated with the mark, even when the download is normally performed, the user may feel insecure about the download. If a problem occurs during the download, the user cannot know of the occurrence of the problem. Unfortunately, the user cannot promptly try to solve the problem.

According to the technique disclosed in the above-identified Publication, the marks representing the points, through each of which related information can be accessed using the corresponding stored URL, are displayed on the map. The user can easily access information related to a point of interest.

Disadvantageously, according to the technique, the user cannot know the description of information provided from the URL associated with each mark before actually browsing the information. Unfortunately, although the user can use information related to a point over the Internet, it is difficult to make use of the information depending on the description of the information.

SUMMARY OF THE INVENTION

Accordingly, it is an object of the present invention to show a user the progress of downloading Web pages from a Web site in a convenient form when the Web pages are automatically downloaded from the Web site associated with a point.

Another object of the present invention is to enable a user in a vehicle to easily select and use a Web site in accordance with a point associated with information provided by the Web site and the description of the information.

According to the present invention, there is provided a vehicle-mounted apparatus including: a navigation unit for displaying a map to provide route guidance information to a user on the displayed map; a Web browser for accessing a Web page to display the Web page; a storage unit for storing point information blocks assigned to respective points, each point information block containing point coordinates indicating the geographical coordinates of the corresponding point and the URL of a Web site, which provides information associated with the point, such that the coordinates are related to the Web site URL; a page memory for saving at least one Web page of each Web site; an automatic download unit for accessing a Web site associated with each point matching a predetermined condition among the points, which have the point information blocks stored in the storage unit, using the Web site URL contained in the corresponding point information block via wireless communication to download at least one Web page of the Web site to the page memory; a mark control unit for displaying a mark at a position corresponding to the point coordinates contained in the point information block which also contains the URL of the Web site, of which at least one Web page is being downloaded or has been downloaded by the automatic download unit, on the map displayed by the navigation unit and, in response to a user operation on the mark, allowing the Web browser to access a Web page, downloaded in the page memory, of the Web site corresponding to the operated mark; and a downloading progress display unit for gradually changing the pattern of each mark displayed on the map depending on the gradual progress of downloading Web pages of the Web site corresponding to the mark.

According to the above-mentioned vehicle-mounted apparatus, a mark is displayed at each point which is associated with a Web site in order to accept browsing a Web page of the Web site through the Web browser. For each point, while each Web page of the corresponding Web site is being downloaded, the pattern of the mark is gradually changed depending on the gradual progress of downloading Web pages of the Web site. Thus, it is possible to inform the user of the progress of downloading. The presentation of the progress of downloading to the user by changing the pattern of the corresponding mark is very convenient because the user can immediately grasp the relation between a point associated with the Web site and the progress of downloading the Web pages, so that a display object exclusively for showing the progress of downloading is not needed.

If it takes a long time to download a Web page, therefore, the user can learn that the Web page is being normally downloaded on the basis of a change in the pattern of the corresponding mark. Advantageously, the user is not anxious about whether the download is normally performed. In addition, when the change in the pattern of the mark is stopped, the user can be informed of the occurrence of a download problem. Advantageously, the user can attempt to solve the problem at an early time.

According to the present invention, there is provided a vehicle-mounted apparatus including: a navigation unit for displaying a map to provide route guidance information to a user on the displayed map; a Web browser for accessing a Web page to display the Web page; a storage unit for storing point information blocks assigned to respective points, each point information block containing point coordinates indicating the geographical coordinates of the corresponding point and the URL of a Web site, which provides information associated with the point, such that the coordinates are related to the Web site URL; a page memory for saving at least one Web page of each Web site; an automatic download unit for accessing a Web site associated with each point matching a predetermined condition among the points, which have the point information blocks stored in the storage unit, using the Web site URL contained in the corresponding point information block via wireless communication to download at least one Web page of the Web site to the page memory; a mark control unit for displaying a mark at a position corresponding to the point coordinates contained in the point information block which also contains the URL of the Web site, of which at least one Web page is being downloaded or has been downloaded by the automatic download unit, on the map displayed by the navigation unit and, in response to a user operation on the mark, allowing the Web browser to access a Web page, downloaded in the page memory, of the Web site corresponding to the operated mark; and a Web site image display unit for displaying an image in the vicinity of each mark displayed on the map, at a position associated with each mark on the map, or at each mark, the image representing a Web page of a Web site corresponding to each mark, or a part of the Web page, or content included in the Web page.

Instead of or in addition to the Web page image display unit, the above-mentioned vehicle-mounted apparatus may include a Web site information display unit for displaying information extracted from a Web page of the Web site corresponding to each mark in the vicinity of the mark displayed on the map or at a position associated with the mark on the map.

According to the above-mentioned vehicle-mounted apparatus, at each point associated with the Web site of which a Web page is being downloaded or has been downloaded, an image representing the Web page of the Web site, a part thereof, or content included in the Web page and/or information extracted from the Web page are displayed in the vicinity of the corresponding mark, which is displayed in order to accept browsing of the Web site through the Web browser, alternatively, at a position associated with the mark on the map. The user can know to some degree the description of information provided by the Web site corresponding to each mark on the basis of the displayed image and/or information. Consequently, the user can select and use a Web site of interest in accordance with a point associated with information provided by the Web site and the description of the information by easily operating the corresponding mark at the position related to the Web site on the map, the mark being displayed together with the image representing the Web page, a part thereof, or content included in the Web page and/or the information extracted from the Web page. In the case where information extracted from the Web page is displayed, so long as the displayed information is useful for the user, the user does not need to operate the corresponding mark to view the Web site using the Web browser, i.e., the user does not need to perform any more operations.

According to the present invention, there is provided a vehicle-mounted apparatus including: a navigation unit for displaying a map to provide route guidance information to a user on the displayed map; a Web browser for accessing a Web page to display the Web page; a storage unit for storing point information blocks assigned to respective points, each point information block containing point coordinates indicating the geographical coordinates of the corresponding point and the URL of a Web site, which provides information associated with the point, such that the coordinates are related to the Web site URL; a page memory for saving at least one Web page of each Web site; an automatic download unit for accessing a Web site associated with each point matching a predetermined condition among the points, which have the point information blocks stored in the storage unit, using the Web site URL contained in the corresponding point information block via wireless communication to download at least one Web page of the Web site to the page memory; a mark control unit for displaying a mark at a position corresponding to the point coordinates contained in the point information block which also contains the URL of the Web site, of which at least one Web page is being downloaded or has been downloaded by the automatic download unit, on the map displayed by the navigation unit and, in response to a user operation on the mark, allowing the Web browser to access a Web page, downloaded in the page memory, of the Web site corresponding to the operated mark; and a Web site search unit for searching the Web pages stored in the page memory for a Web page having the description matching a search keyword specified by the user and making the display pattern of the mark corresponding to the Web site, which the obtained Web page belongs to, different from those of the other marks.

According to the above-mentioned vehicle-mounted apparatus, the user can retrieve a Web page containing the description of information of interest from the page memory which stores the downloaded Web pages of the Web sites. The user can find the point associated with the Web site including the retrieved Web page on the basis of the pattern of the mark displayed at the point.

Therefore, the user can select and use a Web site of interest in accordance with a point associated with the Web site and the description of information provided by the Web site by easily operating the mark at the associated position on the map, the mark having a pattern different from those of the other marks.

According to the present invention, there is provided a vehicle-mounted apparatus including: a navigation unit for displaying a map to provide route guidance information to a user on the displayed map; a Web browser for accessing a Web page to display the Web page; a storage unit for storing point information blocks assigned to respective points, each point information block containing point coordinates indicating the geographical coordinates of the corresponding point and the URL of a Web site, which provides information associated with the point, such that the coordinates are related to the Web site URL; an icon generation unit for setting each point matching a predetermined condition as a target point among the points having the point information blocks stored in the storage unit and accessing a Web site associated with each target point using the Web site URL contained in the corresponding point information block via wireless communication to obtain a Web page of the Web site and generate an icon representing an image of the obtained Web page, a part thereof, or content included in the Web page such that the icon is linked to the Web site URL contained in the point information block of the target point; an icon display unit for displaying the generated icon corresponding to each target point at a position specified by the point coordinates contained in the point information block of the target point on the map displayed by the navigation unit; and a Web site access control unit for, in response to a user operation on the displayed icon, allowing the Web browser to access a Web page specified by the Web site URL linked to the operated icon.

According to the above-mentioned vehicle-mounted apparatus, at each point associated with the Web site providing associated information, an icon representing an image of a Web page of the Web site, a part thereof, or content included in the Web page is displayed. Consequently, the user can know to some degree the description of information provided by the Web site corresponding to each icon. Therefore, the user can select and use a Web site of interest in accordance with a point associated with the Web site and the description of information provided by the Web site by easily operating the icon at the associated position on the map.

In this instance, in the vehicle-mounted apparatus, when the navigation unit searches a recommended route to a destination set by the user and displays the map and the recommended route thereon, the point information block of each point matching the predetermined condition may contain the point coordinates along the searched recommended route or in the vicinity of the recommended route.

In addition, according to the above-mentioned vehicle-mounted apparatus, the navigation unit may display a registered point mark at a position corresponding to the point coordinates contained in each of the point information blocks of the respective points, the point information blocks being stored in the storage unit. Instead of the icon, generated by the icon generation unit, corresponding to each target point, the icon display unit may display a registered point mark, displayed by the navigation unit, indicating the target point.

According to the present invention, there is provided a vehicle-mounted apparatus including: a navigation unit for searching a recommended route to a destination set by a user to display a map and the recommended route on the map; a Web browser for accessing a Web page to display the Web page; a storage unit for storing point information blocks regarding respective points, each point information block including point coordinates indicating the geographical coordinates of the corresponding point and the URL of a Web site, which provides information associated with the point, such that the coordinates are related to the Web site URL; an icon generation unit for setting each point, which has the point information block containing the point coordinates along or in the vicinity of the searched recommended route, as a target point among the points having the point information blocks stored in the storage unit and accessing the Web site associated with each target point using the Web site URL contained in the corresponding point information block via wireless communication to obtain a Web page of the Web site and generate an icon representing an image of the obtained Web page, a part thereof, or content included in the Web page such that the icon is linked to the Web site URL contained in the point information block of the target point; an icon arrangement window display unit for displaying an icon arrangement window in which the generated icons corresponding to the respective target points are arranged in the order that the user passes the corresponding points when the user drives along the recommended route; and a Web site access control unit for, in response to a user operation on one of the icons in the displayed icon arrangement window, allowing the Web browser to access a Web page specified by the Web site URL associated with the operated icon.

According to the vehicle-mounted apparatus, when a recommended route is determined, an icon arrangement window is displayed. In the icon arrangement window, icons each representing an image of a Web page of a Web site providing information associated with the corresponding point, a part of the Web page, or content included therein are arranged in the order that the user will pass the corresponding points. Consequently, the user can immediately grasp the types of listed points along the recommended route and the arrangement order thereof on the basis of the icon arrangement window and use such information to make a driving plan. In addition, the user can view a Web site which provides information related to a point by simply operating the corresponding icon. Thus, the user can obtain more detailed information regarding the point.

According to the above-mentioned vehicle-mounted apparatus, each point information block may contain point type information representing the type of the corresponding point and the icon arrangement window display unit may classify the icons generated by the icon generation unit by the point type information and arrange the classified icons in the icon arrangement window. Thus, the user can easily use a Web site according to the point type.

In addition, the icon arrangement window display unit may display a distance to each target point or expected driving time required until the user passes the corresponding point along the recommended route in addition to each icon arranged in the icon arrangement window.

Therefore, according to the present invention, in automatically downloading at least one Web page of a Web site associated with each point, the progress of downloading Web pages from the Web site can be presented in a convenient form to the user.

Also, according to the present invention, the user in the vehicle can easily select and use a Web site in accordance with a point associated with information provided by the Web site and the description of the information.

BRIEF DESCRIPTION OF THE DRAWINGS

FIG. 10 is a flowchart of a process executed by a vehicle-mounted system according to a fourth embodiment of the present invention;

DESCRIPTION OF THE PREFERRED EMBODIMENTS

Embodiments of the present invention will be described hereinbelow.

Figure 1:
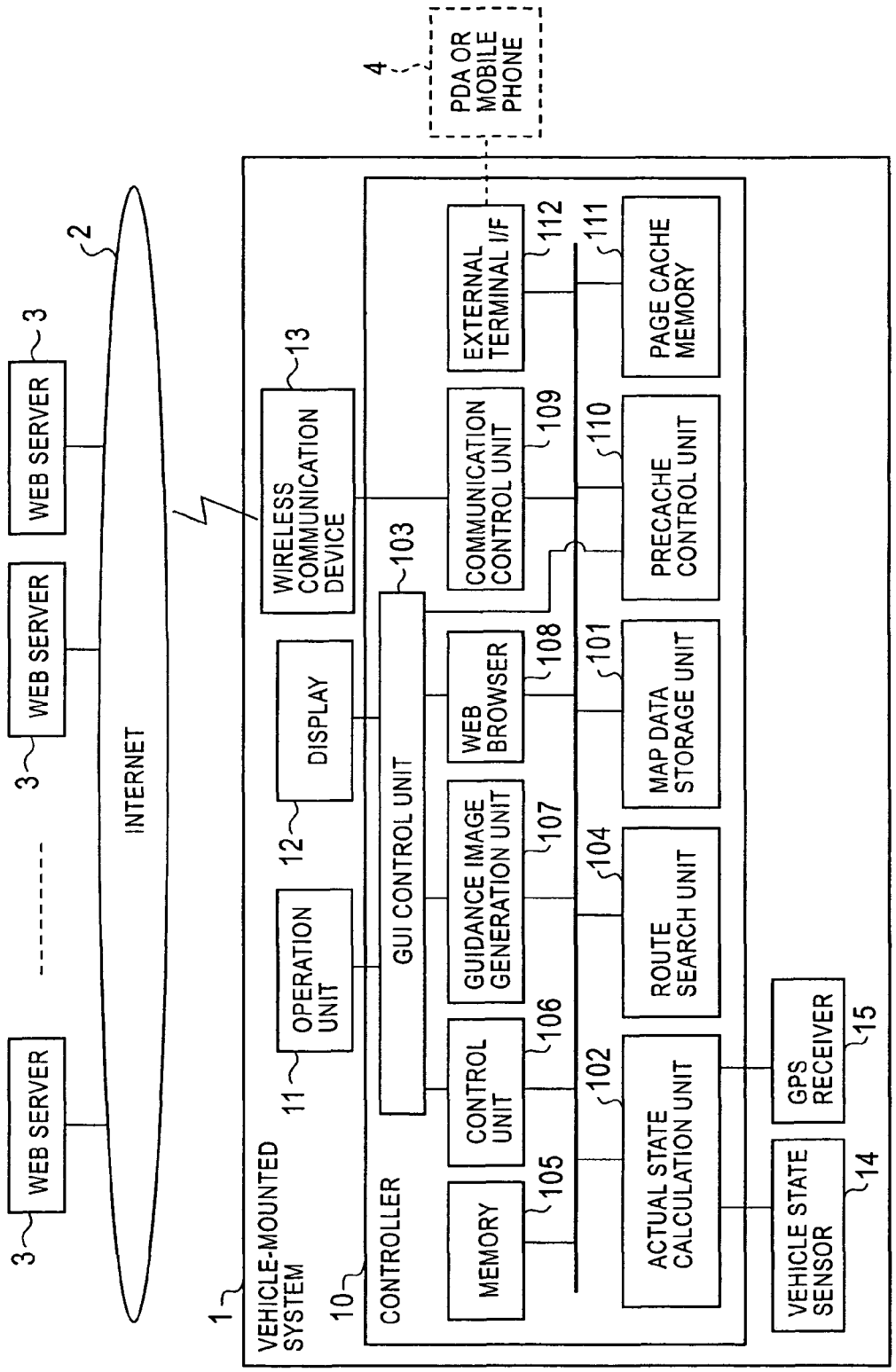
FIG. 1 is a block diagram of the structure of an information system according to embodiments of the present invention.

FIG. 1 shows the structure of an information system according to embodiments of the present invention.

Referring to FIG. 1, the information system includes a vehicle-mounted system 1 which is mounted in a vehicle, the Internet 2 connecting to the vehicle-mounted system 1 via wireless communication, and a plurality of Web servers 3. Each Web server 3 includes at least one Web site having at least one Web page.

The vehicle-mounted system 1 includes a controller 10, an operation unit 11, a display 12, a wireless communication device 13 for connecting to the Internet 2, a vehicle state sensor 14, and a GPS receiver 15. The controller 10 includes: a map data storage unit 101 which serves as a storage device, such as an HDD; an actual state calculation unit 102; a graphical-user-interface (GUI) control unit 103 for processing inputs and outputs between a user operating the operation unit 11 and the display 12 and the respective components of the vehicle-mounted system 1; a route search unit 104; a memory 105; a control unit 106; a guidance image generation unit 107; a Web browser 108; a communication control unit 109; a precache control unit 110; a page cache memory 111; and an external terminal interface 112 for connecting a removable external terminal 4, such as a personal digital assistant (PDA) or a mobile phone (cellular phone).

The wireless communication device 13 includes, e.g., a mobile phone, or cellular phone. In this case, the wireless communication device 13 connects to the Internet 2 via a mobile phone network. The vehicle state sensor 14 includes a set of sensors for detecting the state of the corresponding vehicle, e.g., direction sensors, such as an angular acceleration sensor and a geomagnetic sensor, and a vehicle speed sensor including a vehicle speed pulse sensor.

A part of the above-mentioned vehicle-mounted system 1 can serve as a CPU circuit with a general hardware structure including a microprocessor, a memory, and other peripheral devices, such as a graphic processor and a geometric processor. In this case, each component of the CPU circuit is realized as a process embodied by executing a prepared program through the microprocessor. In addition, the program can be provided to the CPU circuit through a recording medium or a proper communication path.

Figure 2:
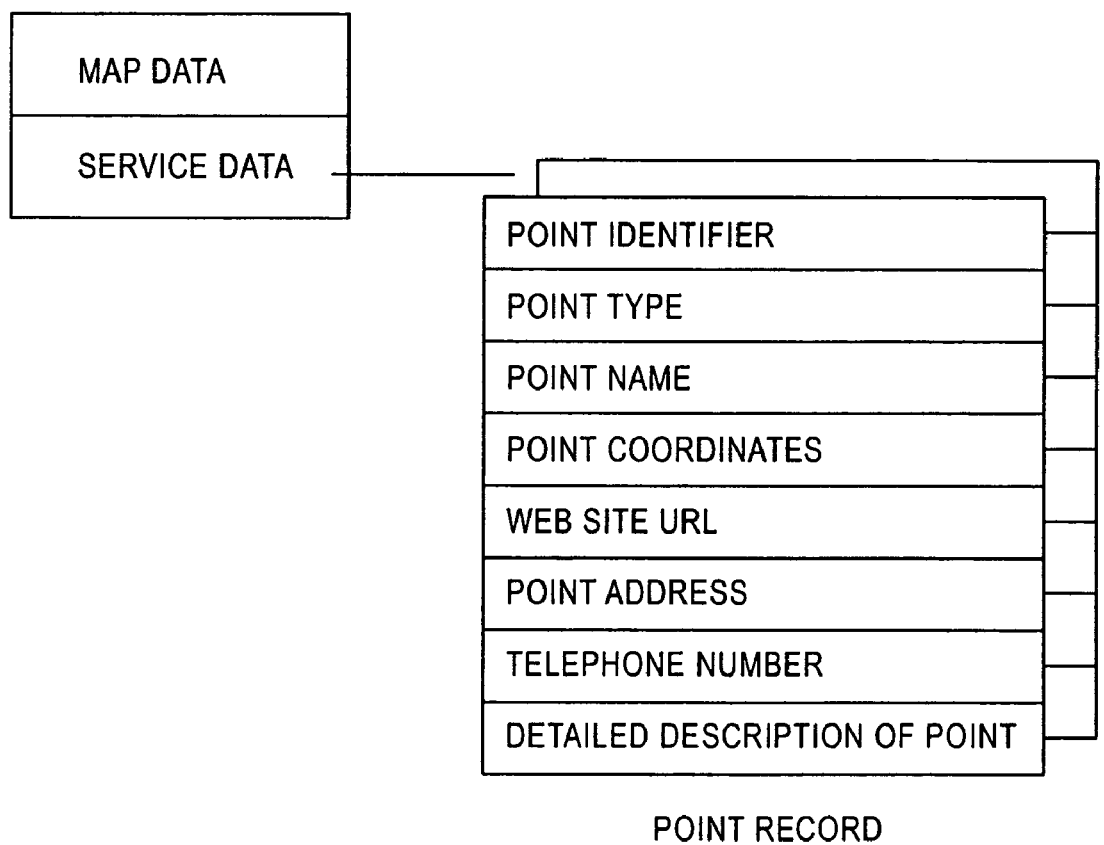
FIG. 2 shows map data and service data held by a vehicle-mounted system according to embodiments of the present invention.

Referring to FIG. 2, the map data storage unit 101 stores map data regarding maps, and service data. The service data includes point records of a plurality of points selected as points of interest (POIs), which will interest the users. Each point record contains a point identifier uniquely assigned to the point, a point type indicating the type of the point, e.g., a restaurant or a theme park, a point name, point coordinates indicating the latitude and the longitude of the point, a Web site URL representing the URL of the top page (homepage) of a Web site associated with the point, a point address, a telephone number of the point, and a more detailed description about the point, i.e., various information regarding the point.

In the vehicle-mounted system 1 with the above-mentioned structure, the actual state calculation unit 102 repeats the following process. That is, the actual state calculation unit 102 performs a map matching process to a current position, which is estimated on the basis of outputs of the vehicle state sensor 14 and of the GPS receiver 15, using a map representing an area surrounding the last determined current position, the map being shown by map data read from the map data storage unit 101. According to the process, the actual state calculation unit 102 determines the most reliable coordinates, serving as the current position, and the most reliable direction, serving as the present traveling direction, and stores the determined position and direction in the memory 105.

In response to a request from the user for setting a destination, the control unit 106 accepts the destination through the operation unit 11 and the GUI control unit 103 from the user and sets the destination in the memory 105. After that, the control unit 106 instructs the route search unit 104 to search a recommended route to the destination. The route search unit 104 reads out map data regarding a necessary geographical range from the map data storage unit 101, calculates a minimum cost route from the current position to the destination set in the memory 105 using a predetermined cost model based on, e.g., shortest distance, and sets the calculated recommended route in the memory 105.

When the current position set in the memory 105 is close to the destination, the control unit 106 determines that the vehicle has reached the destination and clears the destination and recommended route set in the memory 105.

The guidance image generation unit 107 generates a map image corresponding to a map display range, which is calculated by the control unit 106 according to the current position set in the memory 105 and a map display scale set at that time, on the basis of the map data stored in the map data storage unit 101. In addition, the guidance image generation unit 107 generates a guidance image such that the guidance image is superimposed on the generated map image, the guidance image including a graphic representing the current position set in the memory 105, a graphic indicating the recommended route, and a graphic indicating the destination. The guidance image generation unit 107 displays the generated images on the display 12 through the GUI control unit 103.

Figure 3A:
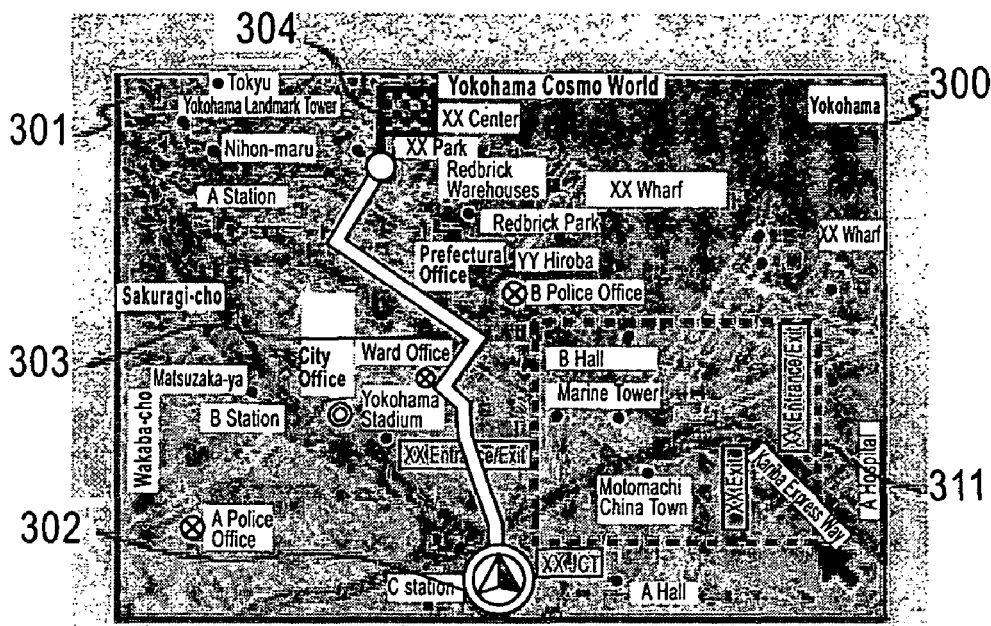
FIGS. 3A to 3D show examples displayed by a vehicle-mounted system according to a first embodiment of the present invention.

FIG. 3A shows a guidance image 300 displayed on the display 12 as mentioned above. In the guidance image 300, a current position mark 302 representing the current position of the vehicle, a route graphic 303 representing the recommended route in the map display range, and a destination mark 304 representing the destination are displayed on a map image 301 showing the vicinity of the current position.

The Web browser 108 downloads at least one Web page of the URL, specified by the user or the precache control unit 110, of a Web site on the Web server 3 over the Internet 2 through the communication control unit 109 and the wireless communication device 13 and displays the downloaded Web page on the display 12. When the downloaded Web page is not stored in the page cache memory 111, the Web page is saved in the page cache memory 111. If the Web page of the URL specified by the user or the precache control unit 110 has already been stored in the page cache memory 111, the Web page is not downloaded. The Web page is read from the page cache memory 111 and is then displayed on the display 12. As will be described hereinafter, the precache control unit 110 downloads at least one Web page from the corresponding Web site through the communication control unit 109 and the wireless communication device 13 over the Internet 2 for storing at least one Web page from every Web site. The page cache memory 111 also stores download completion information regarding the identification of Web sites in which downloading of the Web pages is completed.

A process executed by the precache control unit 110 will now be described.

Figure 4A:
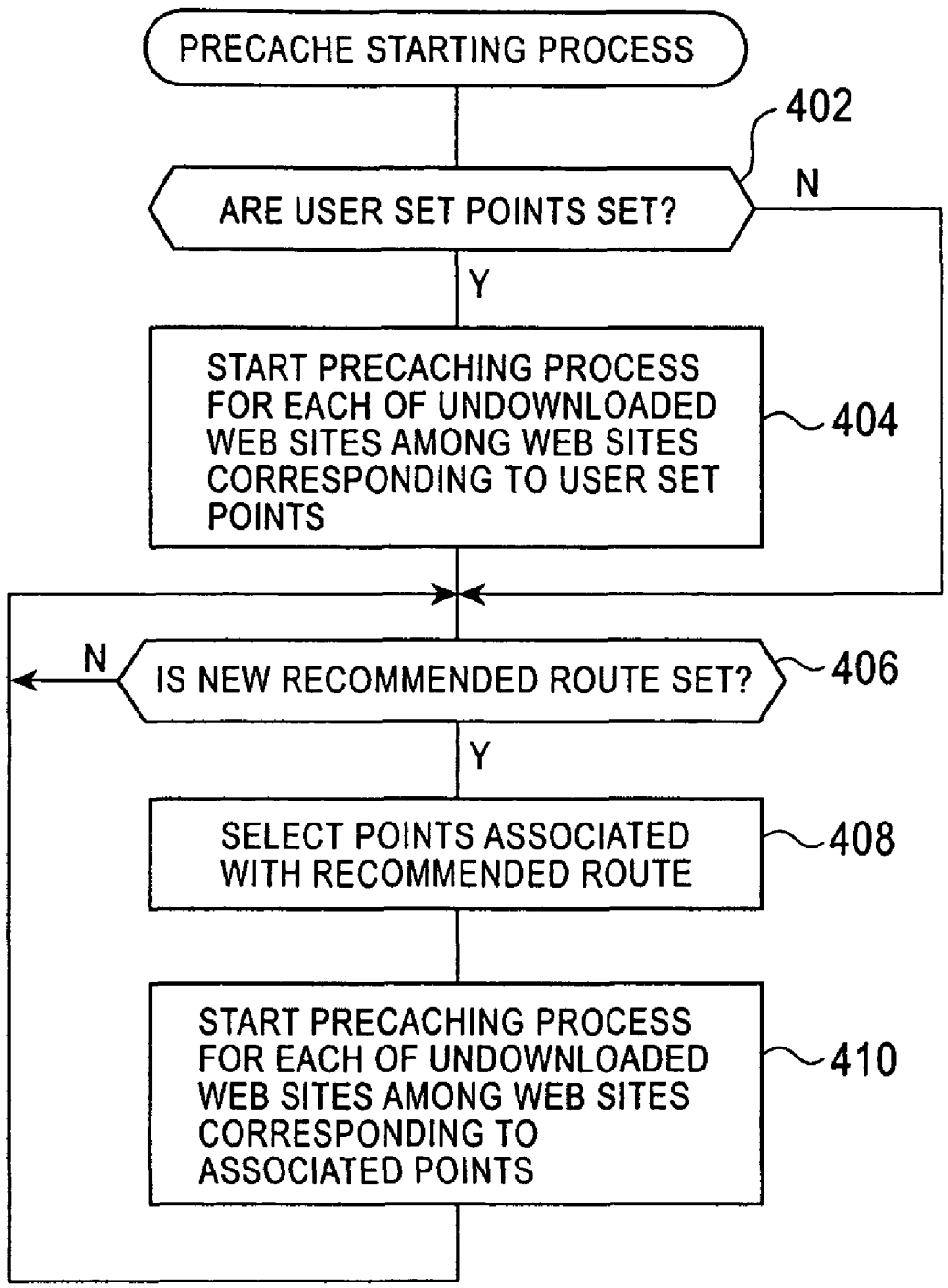
FIGS. 4A and 4B show flowcharts of processes executed by the vehicle-mounted system according to the first embodiment.

FIG. 4A shows a precache starting process by the precache control unit 110. The precache starting process begins when the vehicle-mounted system 1 is activated by turning on an accessory power supply (ACC) of the vehicle.

Referring to FIG. 4A, whether a user has set points in the memory 105 is checked (step 402). Point identifiers contained in the point records of respective points selected by the user are registered as user set points in the memory 105. In other words, when the control unit 106 receives a request to set user set points on the map from the user through the operation unit 11 and the GUI control unit 103, the control unit 106 accepts the specification of an arbitrary area 311 by the user on the map image 301 serving as the guidance image 300 (see FIG. 3A). The control unit 106 sets point identifiers, contained in respective point records having the point coordinates in the accepted area 311, as user set points in the memory 105. In addition, when receiving a user-set-point search request from the user through the operation unit 11 and the GUI control unit 103, the control unit 106 accepts the search using, e.g., a point name, a point type, or an address as a search key, from the user and searches and sets point identifiers contained in the point records having the descriptions matching the search key as user set points in the memory 105. For example, when the user specifies "Address: Tokyo" as a search key, point identifiers of respective point records, in each of which the point address is registered as an address in Tokyo, are set as user set points in the memory 105.

When the above-mentioned user set points are not set in the memory 105, the process proceeds to step 406. On the other hand, when the user set points are set in the memory 105, the process proceeds to step 404. In step S404, specific point records are extracted from the point records specified by the point identifiers of the user set points. In other words, in each specific point record, downloading a Web page of the Web site, specified by the Web site URL contained in the point record, to the page cache memory 111 is not completed. A process of precaching a Web site specified by the Web site URL contained in the point record is started for every extracted point record. Then, the process proceeds to step 406. The precaching process will be described in more detail later. Whether a Web page of a Web site has already been downloaded in the page cache memory 111 is determined on the basis of the download completion information in the page cache memory 111.

In step 406, whether a new recommended route is set in the memory 105 is monitored. If a new recommended route is set in the memory 105, point records having the point coordinates at points associated with the recommended route are selected with reference to map data (step 408). In this instance, the points associated with the recommended route mean points near the destination and the recommended route.

Specific point records are extracted from the selected point records. In other words, in each specific point record, downloading a Web page of the Web site, specified by the Web site URL contained in the point record, to the page cache memory 111 is not completed. The process of precaching a Web site specified by the Web site URL contained in the point record is started for every extracted point record (step 410). After that, the process is returned to step 406 to monitor whether a new recommended route is set.

The precaching process in each of steps 404 and 410 of the precache starting process will now be described below.

Figure 4B:
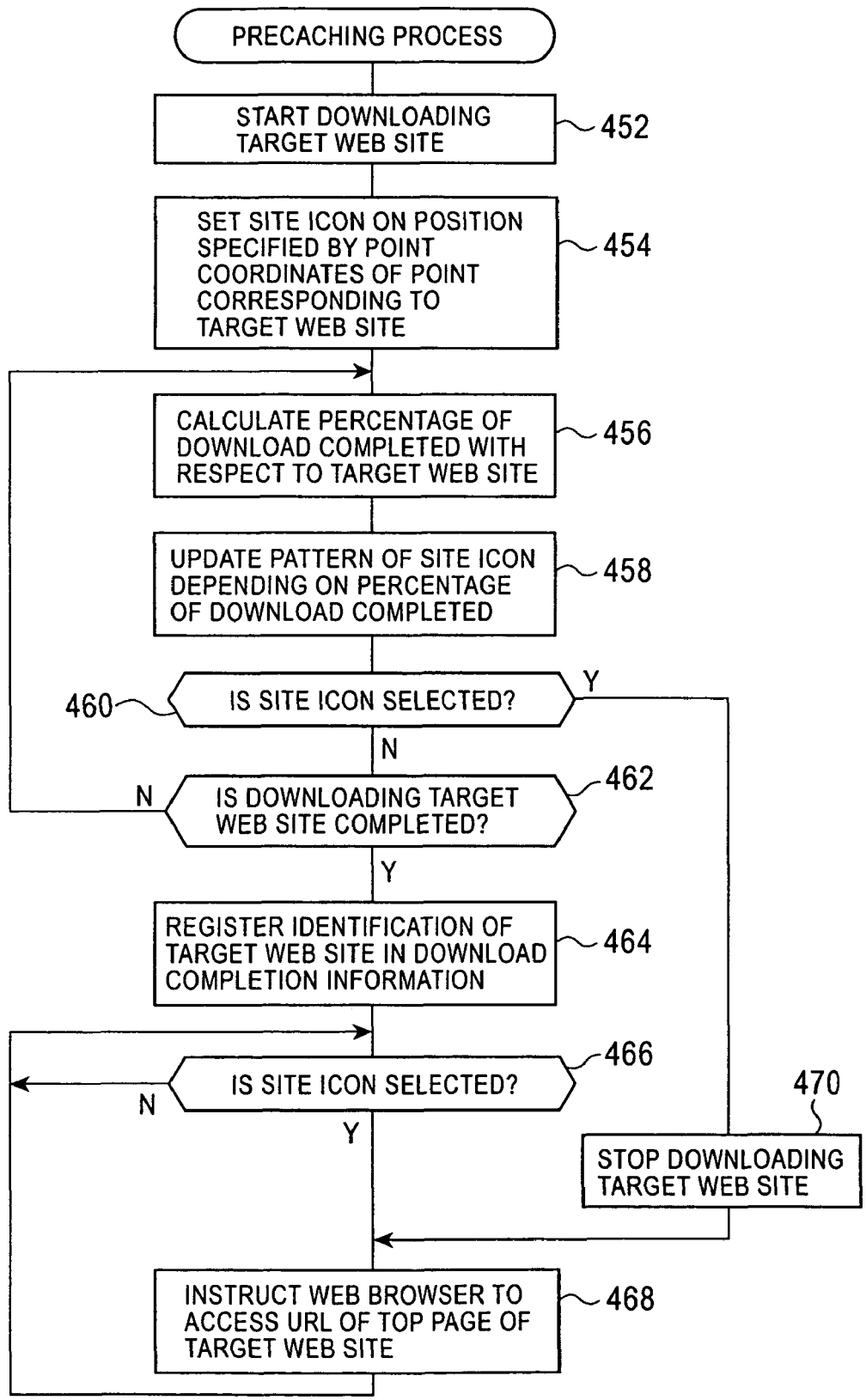

FIG. 4B shows the precaching process. As shown in FIG. 4B, according to the precaching process, a target Web site on the Web server 3 is accessed through the communication control unit 109 and the wireless communication device 13 over the Internet 2 and downloading at least one Web page of the target Web site is started (step 452). In downloading the target Web site, the top page of the target Web site specified by the corresponding Web site URL is downloaded as a target Web page. Subsequently, among Web pages as hyperlinks included in the downloaded Web page, Web pages specified by URLs below a folder which directly includes the top page of the target Web site are sequentially downloaded as target Web pages. After that, among Web pages as hyperlinks included in each downloaded target Web page, Web pages specified by URLs below a folder which directly includes the top page of the corresponding target Web site are sequentially downloaded as target Web pages. The above-mentioned download is repeated until there is no target Web page to be downloaded. If a target Web page has already been stored in the page cache memory 111, downloading the Web page is omitted. Each Web page is stored in the page cache memory 111 such that the URL of the Web page, serving as a download source, is linked to the identification of the Web site which the Web page belongs to.

In other words, when the URL of a target Web site is expressed as "http://www aaa.co.jp/home/" or "http://www.aaa.co.jp/home/bb.html", the top page of the Web site specified by the Web site URL is set as a target Web page. After that, Web pages linked to the target Web page by hyperlinks each including "http://www.aaa.co.jp/home/" at the head of a character string are sequentially downloaded as target Web pages.

After starting the download of the target Web site, a site icon is displayed in a position corresponding to the point coordinates, contained in the point record including the Web site URL of the target Web site, on the map image 301 serving as the guidance image 300 through the GUI control unit 103 (step 454). The site icon represents that Web pages of the target Web site associated with the point are being downloaded to the page cache memory 111 or that the target Web site has been downloaded therein. The point name contained in the point record of the point corresponding to the target Web site can simultaneously be displayed in the vicinity of the site icon.

The percentage of download completed with respect to the target Web site is calculated (step 456). The pattern of the displayed site icon corresponding to the target Web site is changed depending on the calculated percentage of download completed (step 458). The percentage of download completed is obtained as the ratio of downloaded Web pages to the total Web pages of the current target Web site or the ratio of downloaded data size to the total data size of the current target Web site. If all Web pages of the target Web site have been downloaded, the percentage of download completed can be calculated as the ratio of downloaded Web pages to the total Web pages of the target Web site in the last download or the ratio of downloaded data size to the total data size of the target Web site in the last download. Alternatively, the top page of each Web site can describe the total Web pages of the Web site or the total amount of data thereof and the percentage of download completed can be calculated as the ratio of downloaded Web pages to the total Web pages of the target Web site obtained according to the description or the ratio of downloaded data size to the total data size of the target Web site obtained according to the description. The number of total Web pages of the target Web site can be obtained from the number of Web pages each having a title in a "sitemap" in the target Web site or the number of Web pages in the target Web site, the Web pages being specified by hyperlinks each having a character string "sitemap" included in the Web page of the target Web site.

Figure 3B:
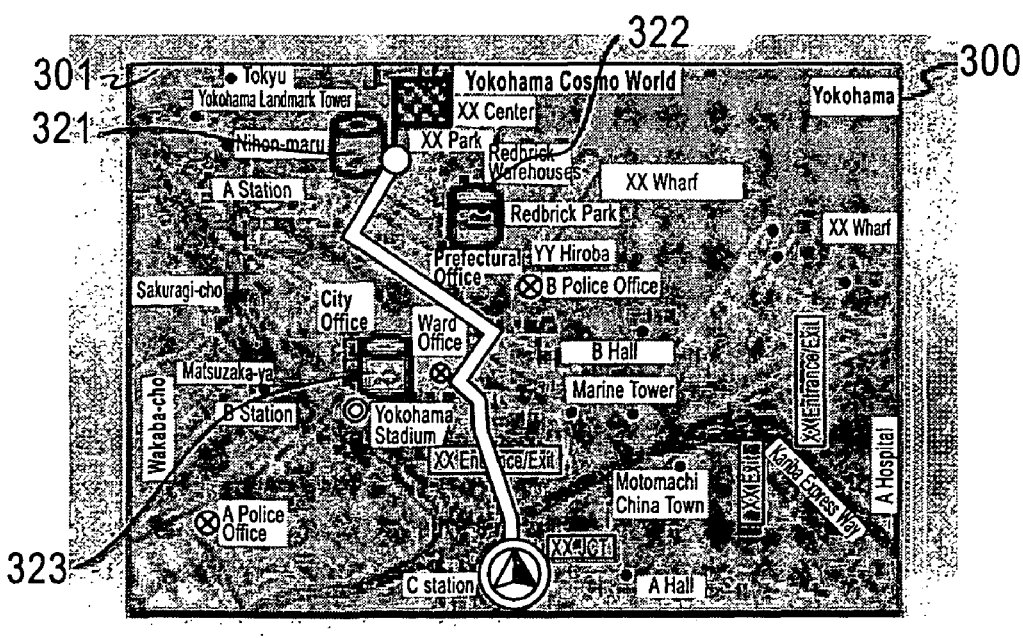

FIG. 3B includes site icons displayed as mentioned above. Referring to FIG. 3B, site icons 321 to 323 are displayed at three points on the map image 301. Each site icon represents that Web pages of a Web site associated with the corresponding point are being downloaded to the page cache memory 111 or that all of the Web pages have been downloaded and has a pattern that changes depending on the percentage of download completed.

Figure 3C:
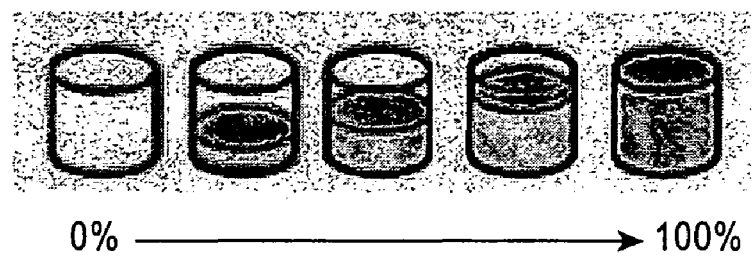

Site icon patterns changed depending on the percentage of download completed are predetermined as shown in, e.g., FIG. 3C. FIG. 3C shows, left-to-right, site icon patterns changed as the percentage of download completed shifts from 0% to 100%. Referring to FIG. 3C, in this example, as the percentage of download completed increases, a drum, serving as a site icon, is more filled with data.

Again referring to FIG. 4B, after the site icon representing the target Web site is displayed, whether the user selects the displayed site icon (step 460) and whether downloading the target Web site is completed (step 462) are monitored.

Steps 456 and 458 are repeated to update the percentage of download completed with respect to a target Web site and change the pattern of the site icon according to the updated percentage of download completed until either of the above-mentioned events occurs.

On the other hand, if downloading the target Web site is completed, the identification of the target Web site is registered in the download completion information in the page cache memory 111 (step 464). The process then waits until the user selects the displayed site icon corresponding to the target Web site (step 466). When the user selects the site icon, the process proceeds to step 468.

Before downloading the target Web site is completed, when the user selects the displayed site icon corresponding to the Web site (step 460), downloading the target Web site is stopped (step 470). The process proceeds to step 468.

In step 468, if the Web browser 108 is not activated, the Web browser 108 is started. The URL of the top page of the target Web site is specified to the Web browser 108 to display the top page. After that, the process is returned to step 466 to monitor whether the user selects the displayed site icon corresponding to the target Web site. As mentioned above, if a Web page specified by the accessed URL is stored in the page cache memory 111, the Web page is not downloaded from the Web site on the Internet 2. The Web page is read from the page cache memory 111 and is used.

Figure 3D:
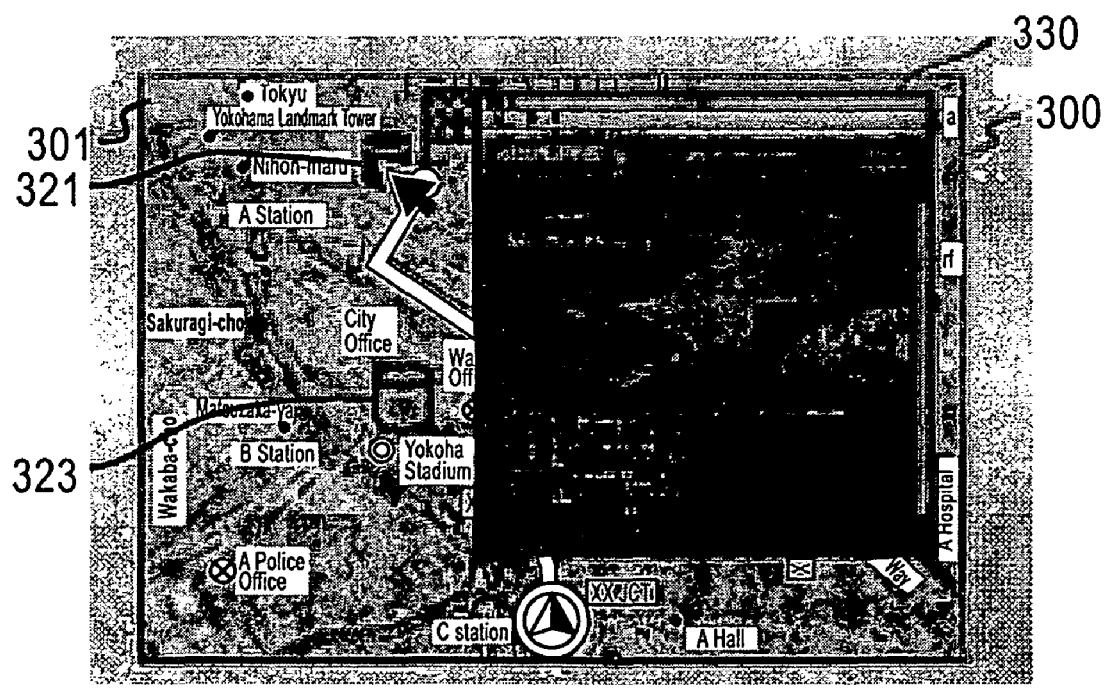

FIG. 3D includes a Web page displayed as mentioned above by the Web browser 108. In this example, in response to a user operation on the site icon 321, the Web browser 108 displays the top page of the Web site corresponding to the site icon 321 in a Web browser window 330, which the Web browser 108 sets on the guidance image 300.

The precache starting process and the precaching process by the precache control unit 110 have been described. In addition to the above-mentioned processes, the precache control unit 110 deletes each Web page of a Web site stored in the page cache memory 111 at a predetermined period of time (e.g., one hour or one day) or longer after being downloaded and updates the download completion information in accordance with the deletion. The precache control unit 110 terminates the precaching process for the target Web site, of which each Web page has been deleted, and deletes the corresponding site icon displayed by the precaching process.

As mentioned above, according to the present embodiment, the user can be informed of the progress of downloading a Web site by gradually changing the pattern of a site icon representing a point associated with the Web site, the site icon being displayed to accept viewing Web pages of the Web site through the Web browser 108. Even when it takes a long time to download a Web site, therefore, the user can determine whether the Web site is being normally downloaded on the basis of a change in the pattern of the site icon corresponding to the Web site. Advantageously, the user is not anxious about whether or not the Web site is being normally downloaded. In addition, when the change in the pattern of the site icon is stopped, the user can be informed of the occurrence of a download problem. Advantageously, the user can solve the problem promptly. The presentation of the progress of downloading to the user by changing the pattern of the corresponding site icon is very convenient because the user can immediately grasp the relation between a point associated with the corresponding Web site, and the progress of downloading the Web site and a display object exclusively for the progress of downloading is not needed.

In the above-mentioned precaching process, information regarding a Web page downloaded from a target Web site can be displayed together with a site icon representing the target Web site.

Figure 5A:
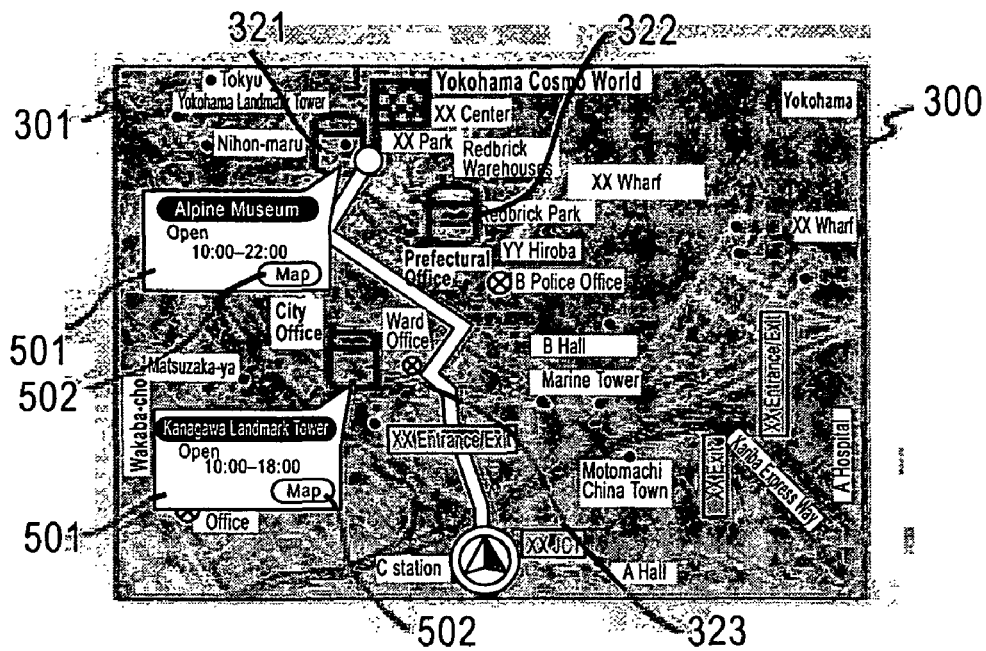
FIGS. 5A to 5D show examples displayed by the vehicle-mounted system according to the first embodiment.

As shown in FIG. 5A, a predetermined type of information extracted by analyzing the description of a Web page of a target Web site downloaded in the page cache memory 111, a point name contained in the point record of a point corresponding to the target Web site, and the title of the top page of the Web site are displayed in an information window 501 provided as a balloon pattern on the corresponding site icon. In this example, on each of the site icons 321 and 323, the information window 501 which shows opening hours information extracted as the predetermined type of information from a Web page of the corresponding Web site is displayed in a balloon pattern.

Regarding the extraction of the predetermined type of information from a Web page and the presentation of the information in the information window 501, when the predetermined type of information to be extracted regards, e.g., opening hours, the information is retrieved from downloaded Web pages using predetermined words related to opening hours, e.g., "opening hours", "opening time", and "closing time", serving as search keys. A portion regarding time denoted as the operating hours is extracted from a Web page such that the search word and the extracted information are paired. The information is displayed in the information window 501. Each time a Web page is downloaded from a target Web site, analyzing the description of the Web page downloaded in the page cache memory 111 and extracting the predetermined type of information are performed until the predetermined type of information is successfully extracted. When the predetermined type of information is successfully extracted, the information window 501 is displayed.

Figure 5B:
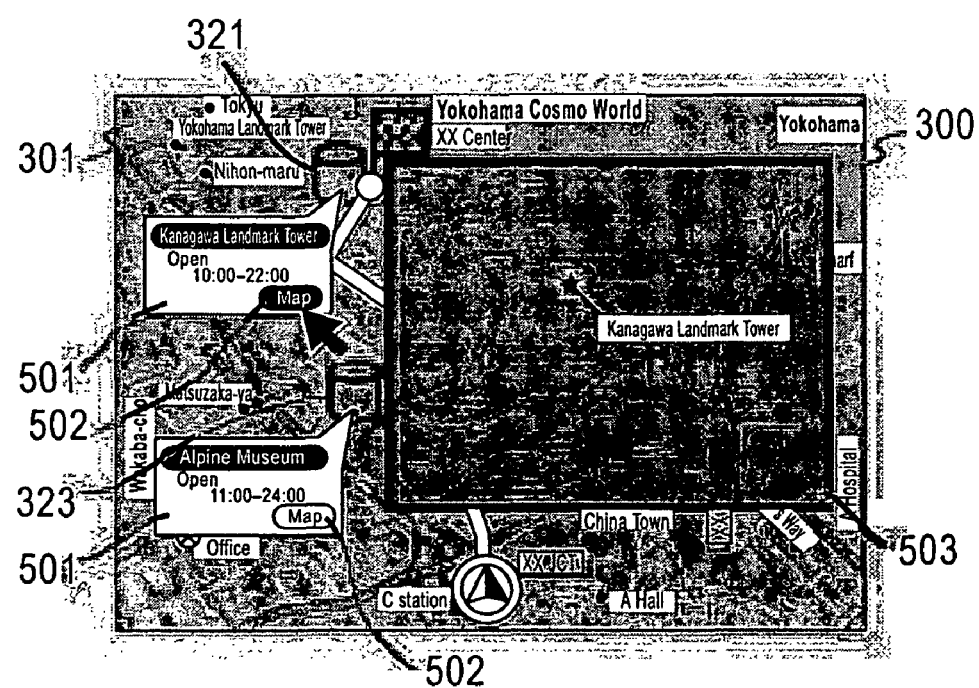

When the information window 501 is displayed together with the corresponding site icon, the Web pages of the target Web site downloaded in the page cache memory 111 are searched for an image of an image file, of which the file name contains a character string, e.g., "map", "accessmap", or "annnaizu", included in some Web page. When the image can be retrieved, the image is estimated as an image of a guidance map of the corresponding point. A "Map" button 502 is set and is displayed in the information window 501. In response to the user operation on the "Map" button 502, as shown in FIG. 5B, a retrieved image 503 is displayed on the guidance image 300.

If a Web page is described in a structured language, such as XML or XHTML, and the Web page includes item type information (e.g., a tag) representing the item type of each display element of the Web page, information regarding, e.g., operating hours, to be displayed in the information window 501 and an image of a guidance map can be retrieved and extracted from the Web pages according to the item type information.

According to the above-mentioned precaching process, instead of or in addition to the information window 501, an image representing the top page of a target Web site can be displayed together with the corresponding site icon.

Figure 5C:
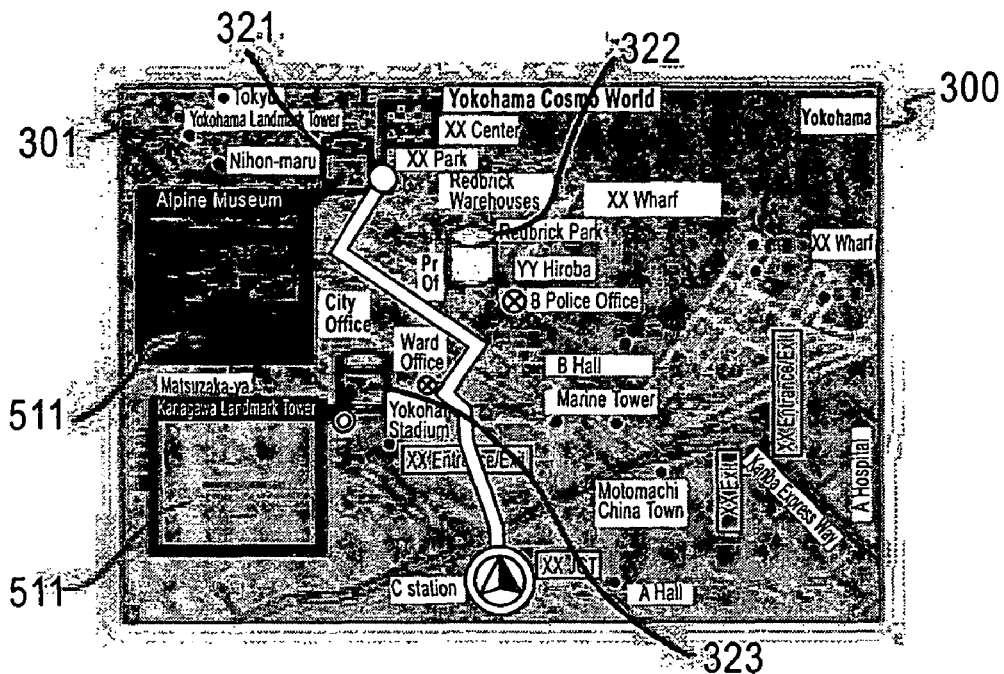

In other words, according to the precaching process, when the top page of a target Web site exists in the page cache memory 111, an image representing the top page is generated and the generated image is displayed as a preview image on the guidance image 300 such that the generated image is related to the site icon corresponding to the target Web site. FIG. 5C includes preview images displayed as mentioned above. In this example, a preview image 511 representing the top page of the Web site corresponding to the site icon 321 and another preview image 511 representing the top page of the Web site corresponding to the site icon 323 are displayed on the guidance image 300 such that the preview images 511 are connected to the site icons 321 and 323, respectively, via lines. When the user selects either of the preview images, the top page of the Web site corresponding to the selected preview image 511 can be displayed by the Web browser 108 in the same way as when the user selects the site icon corresponding to the preview image 511. Regarding a preview image, instead of an image representing the top page of a target Web site, an image representing a part of the top page or an image representing content, such as an image included in the top page, can be used.

In this manner, the user can know to some degree the description of information provided by a Web site corresponding to each site icon on the basis of a preview image 511 representing the image of the top page of the Web site and the presentation of the predetermined type of information extracted from a Web page of the Web site. Accordingly, the user can select a Web site of interest and utilize it with reference to both a point associated with the Web site and the description of information provided by the Web site by merely operating a site icon displayed together with a preview image 511 representing the image of a Web page of the Web site, a part of the Web page, or content included in the Web page and the predetermined type of information extracted from a certain Web page of the Web site, the site icon being displayed in a position associated with the Web site on the map. When the displayed predetermined type of information extracted from the Web page is useful for the user, the user does not need to operate the corresponding site icon to view the Web site using the Web browser 108, i.e., the user does not need to perform any more operations.

Figure 5D:
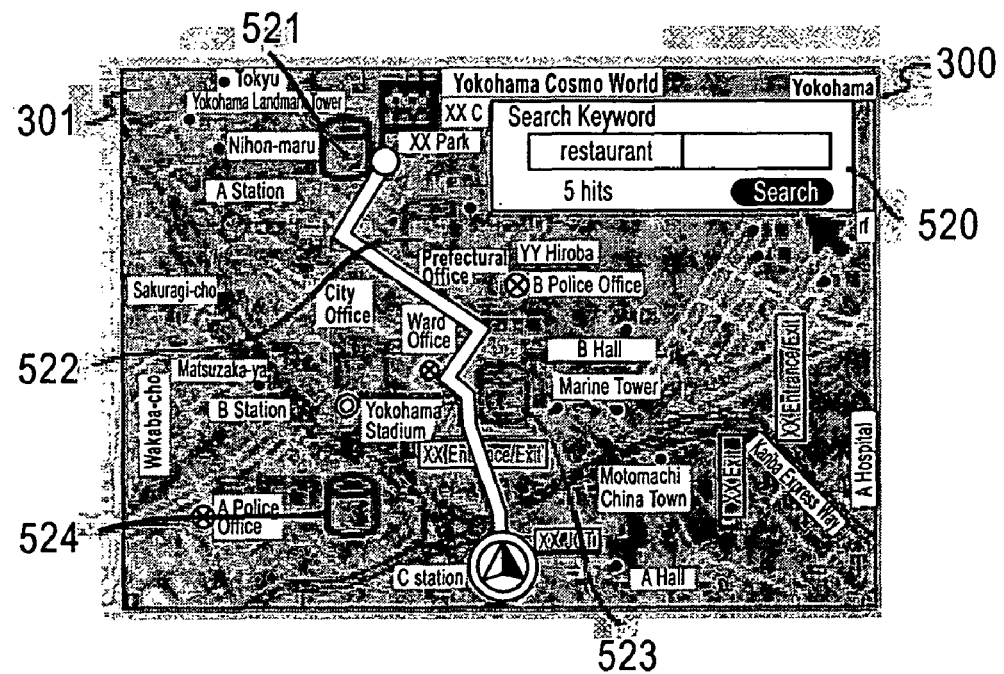

In addition to the above-mentioned processes, when the user requests a search for downloaded Web sites through the operation unit 11 and the GUI control unit 103, the precache control unit 110 performs the following searching process. First, as shown in FIG. 5D, a search window 520 is displayed on the guidance image 300 to accept a search keyword entered by the user. The precache control unit 110 searches Web pages stored in the page cache memory 111 for Web pages containing the search keyword and extracts Web sites which the respective searched Web pages belong to.

The display pattern of a site icon corresponding to each extracted Web site is made different from those of other Web sites. Referring to FIG. 5D, site icons 521 and 524 correspond to respective Web sites to which the Web pages containing the search keyword belong. As shown in FIG. 5D, those icons are highlighted compared to site icons 522 and 523 corresponding to other Web sites.

As mentioned above, when the user selects either of the highlighted site icons, the top page of the Web site corresponding to the selected site icon is displayed through the Web browser 108.

Consequently, the user can retrieve Web pages containing the description of information of interest from the page cache memory 111 in which Web pages downloaded from Web sites are stored. Then, the user can find points associated with the Web sites to which the retrieved Web pages belong on the basis of the display patterns of the site icons on the respective points.

Therefore, the user can select and utilize a Web site of interest with reference to both of a point associated with the Web site and the description of information provided by the Web site by simply operating a highlighted site icon at a position associated with the Web site on a map.

A second embodiment of the present invention will now be described. According to the second embodiment, the precaching process in the information system according to the first embodiment is replaced with a precaching process shown in FIG. 6.

Further, a guidance image generation unit 107 of a vehicle-mounted system 1 generates a guidance image 300 including a point icon to be displayed on a map image 301, which represents an area surrounding a current vehicle position (current position), plus a current position mark 302 representing the current position, a route graphic 303 representing a recommended route within a map display range, and a destination mark 304 representing a destination. The guidance image generation unit 107 displays the guidance image 300 on a display 12 through a GUI control unit 103.

A point icon is displayed at the corresponding position on the map image 301, the position being specified by point coordinates contained in a point record of the corresponding point included in service data stored in a map data storage unit 101. Regarding the pattern of a point icon, a graphic corresponding to the type specified by a point type contained in the corresponding point record is selected from graphics corresponding to various point types. Alternatively, a graphic is preset to a point in every point record by the user and the preset graphic is used. A point record, of which the corresponding point icon is to be displayed, is selected from among point records included in service data stored in the map data storage unit 101 in accordance with the user settings. In other words, the guidance image generation unit 107 displays point icons of only point records including a specific point type selected by the user or display point icons of only point records containing the point coordinates in the vicinity of a recommended route in accordance with the user settings.

Figure 7A:
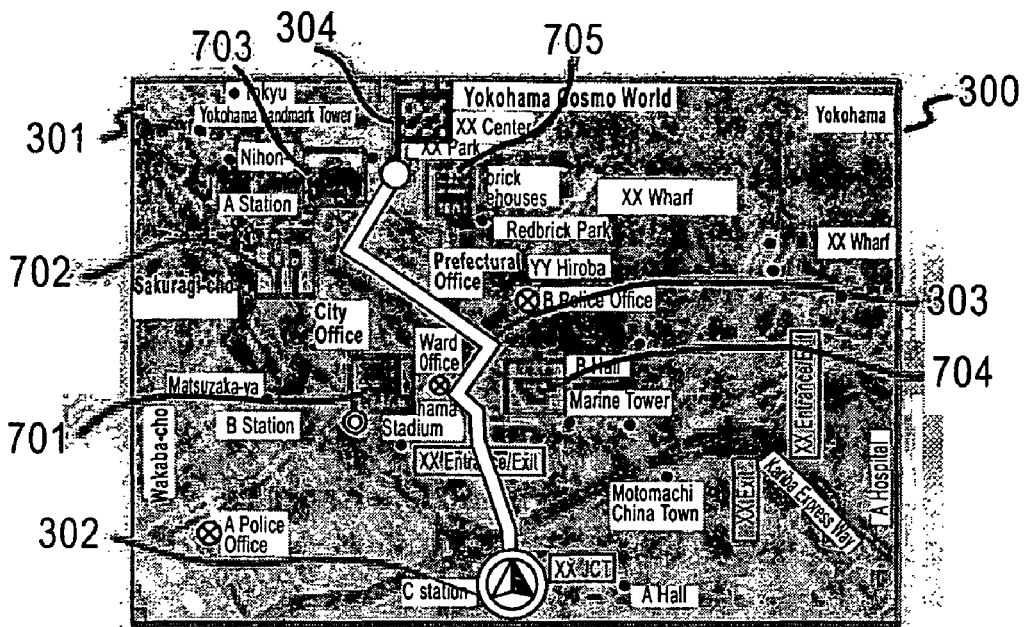
FIGS. 7A to 7F show examples displayed by the vehicle-mounted system according to the second embodiment of the present invention.

FIG. 7A shows a guidance image 300 displayed as described above. On a map image 301, a point icon 701 of a point record in which the point type describes a hotel, a point icon 702 of a point record in which the point type describes a restaurant, a point icon 703 of a point record in which the point type describes a museum, a point icon 704 of a point record in which the point type describes a ramen (Chinese noodle) restaurant, and a point icon 705 of a point record in which the point type describes a hotel are displayed. According to the first embodiment, those point icons can be displayed such that the point icons are included in the guidance image 300.

The precaching process by a precache control unit 110 in the vehicle-mounted system 1 according to the second embodiment will now be described.

Figure 6:
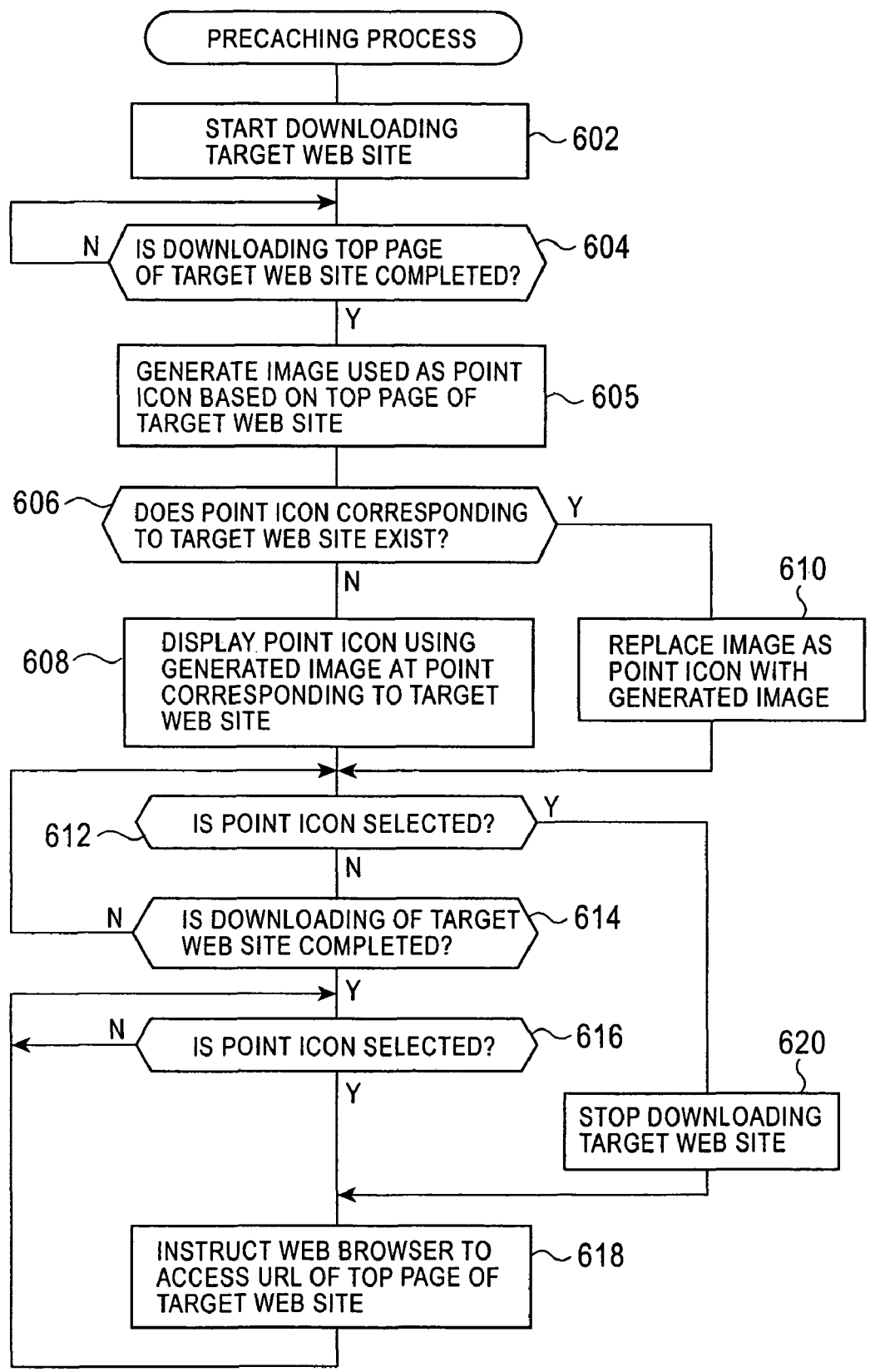
FIG. 6 is a flowchart of a process executed by a vehicle-mounted system according to a second embodiment of the present invention.

FIG. 6 shows a procedure of the precaching process according to the second embodiment. Referring to FIG. 6, upon starting the precaching process with respect to each target Web site set by the precache starting process of FIG. 4A, the target Web site on a Web server 3 is accessed through a communication control unit 109 and a wireless communication device 13 over the Internet 2, thus starting to download at least one Web page of the target Web site (step 602). The target Web site is downloaded in a manner similar to the precaching process according to the first embodiment. Each downloaded Web page is stored in a page cache memory 111 such that the Web page is related to the URL of a download source and the identification of the Web site to which the Web page belongs.

If downloading the top page of the target Web site is completed (step 604), an image used as a point icon is generated from the downloaded top page (step 605). Regarding an image used as a point icon, all or a part of the image of the top page is scaled down to a predetermined point icon size and the resultant image can be used. Alternatively, an image, which is included in the top page and satisfies predetermined conditions, is scaled down to the predetermined point icon size and the resultant image can be used. Further, if the top page includes an image which satisfies the predetermined conditions, the image is scaled down to the predetermined point icon size and the resultant image is used as the corresponding point icon. On the other hand, if the top page does not include such an image, all or a part of the image of the top page is scaled down to the predetermined point icon size and the resultant image may be used as the corresponding point icon.

The above-mentioned predetermined conditions are that the size of an image included in the top page is larger than a predetermined size and the image first appears in the top page. Further, a condition that the image file name of the image contains a specific character string, e.g., "image" or "photo", can be added to the above conditions. If a Web page is described in a structured language, such as XML or XHTML, and includes item type information (e.g., a tag) representing the item type of each display element of the Web page, the panoramic picture of a point associated with the target Web site or the picture of a facility can be extracted from the top page and the extracted picture is used as a point icon.

Regarding an image used as a point icon, an image representing the logo of the target Web site is extracted from the top page. The extracted image can be used as a point icon. An image, of which the image file name contains a character string "logo", is extracted as an image representing the logo. When the top page is described in a structured language, such as XML or XHTML, an image representing the logo is selected on the basis of item type information.

After the image used as a point icon is generated, whether a guidance image 300 includes a point icon corresponding to a point record containing the Web site URL of the target Web site is determined (step 606). If YES, the guidance image generation unit 107 replaces a graphic used as the point icon with the image generated in step 605 (step 610). On the other hand, if the guidance image 300 does not include a point icon corresponding to the point record containing the Web site URL of the target Web site (step 606), the guidance image generation unit 107 is controlled such that the image generated in step 605 is displayed as a point icon at a position corresponding to the point coordinates in the point record containing the Web site URL of the target Web site on the map image 301, serving as the guidance image 300 (step 608).

Figure 7B:
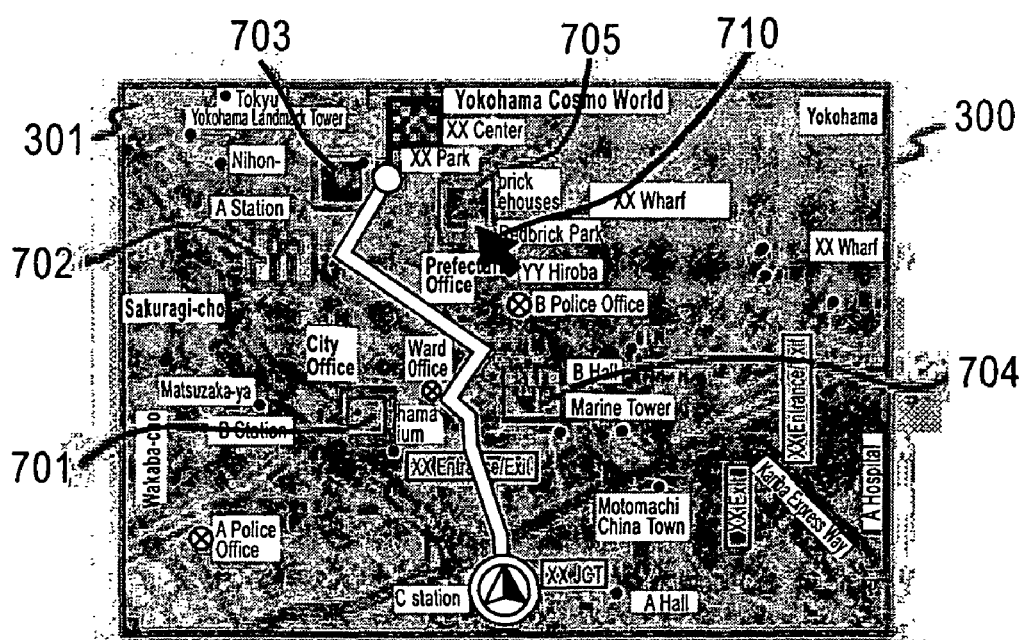

FIG. 7B shows a map in which images generated from the top pages of the respective target Web sites as mentioned above are displayed as point icons. As will be understood from the comparison between FIGS. 7A and 7B, the patterns of the point icons 701 and 703 are changed to images obtained by scaling down the images of the respective top pages and the pattern of the point icon 705 is changed to an image obtained by scaling down an image included in the corresponding top page. In this instance, the point icons 701, 703, and 705 using the images generated from the respective top pages are highlighted compared to the other point icons 702 and 704 by means of framing or blinking so that the user can easily distinguish the point icons using the images generated from the respective top pages from the other point icons.

Again referring to FIG. 6, according to the precaching process, after the point icon using the image generated from the top page of the target Web site is displayed as mentioned above (step 608 or 610), whether the user selects the displayed point icon (step 612) and whether downloading of the target Web site is completed (step 614) are monitored.

Before the download of the target Web site is completed, if the user selects the displayed point icon (step 612), the download is stopped (step 620). The process then proceeds to step 618.

On the other hand, before the user selects the displayed point icon, if the download of the target Web site is completed (step 614), the process proceeds to step 616 to monitor whether the user selects the displayed point icon. Then, the process proceeds to step 618.

In step 618, if the Web browser 108 is not activated, the Web browser 108 is started. The URL of the top page of the target Web site is specified to the Web browser 108 to display the top page. The process is returned to step 616 to monitor whether the user selects the displayed point icon.

Figure 7C:
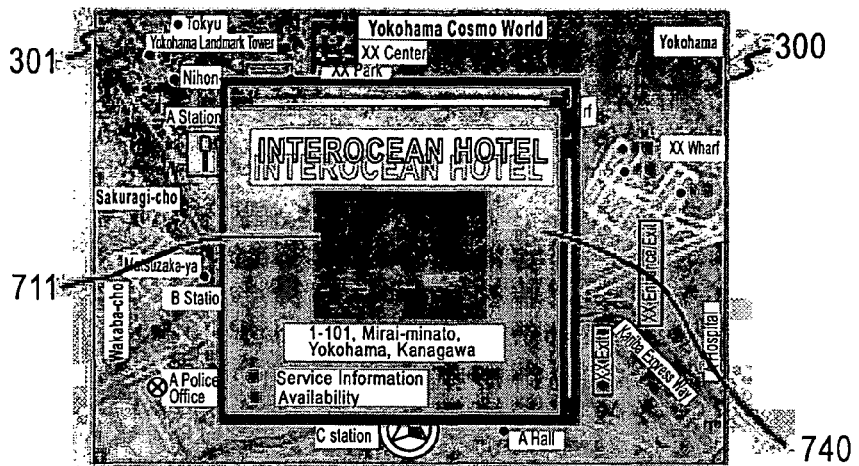
Figure 7E:
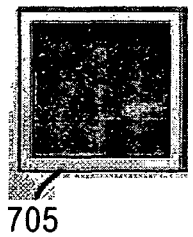
Figure 7D:
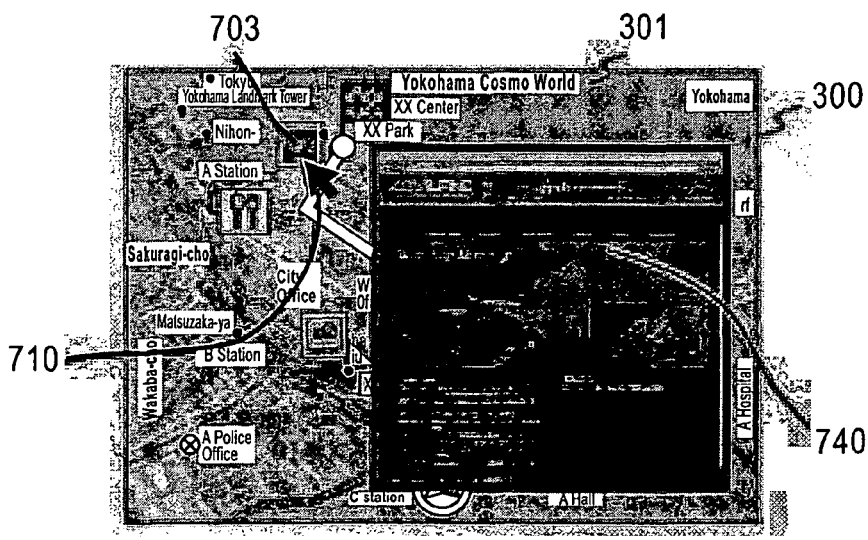
Figure 7F:
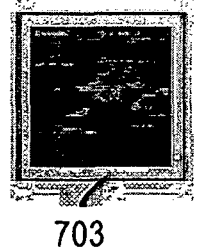

Each of FIGS. 7C and 7D shows the map including a Web page displayed through the Web browser 108 as mentioned above. Referring to FIG. 7C, in response to the user operation of selecting the point icon 705 with a cursor 710, shown in FIG. 7B, the Web browser 108 displays the top page of the Web site corresponding to the point icon 705 in a Web browser window 740, which is set on the guidance image 300 by the Web browser 108. FIG. 7E shows an enlarged view of the point icon 705 in FIG. 7B. As shown in FIG. 7E, the image used as the point icon 705 is obtained by scaling down an image 711 included in the top page displayed in the Web browser window 740 in FIG. 7C. Referring to FIG. 7D, in response to the user operation of selecting the point icon 703 using the cursor 710, the Web browser 108 displays the top page of the target Web site corresponding to the point icon 703 in the Web browser window 740, which is set on the guidance image 300 by the Web browser 108. FIG. 7F shows an enlarged view of the point icon 703 in FIG. 7B. As shown in FIG. 7F, the image used as the point icon 703 is obtained by scaling down a part (a first square portion) of the image of the top page displayed in the Web browser window 740 in FIG. 7D.

In step 602 of the above-mentioned precaching process, downloading only the top page of the target Web page is available instead of downloading each Web page thereof.

The precaching process has been described. In addition to the above precaching process, the precache control unit 110 deletes each Web page of a Web site stored in the page cache memory 111 after a predetermined period of time (e.g., one hour or one day) or longer after being downloaded, and terminates the precaching process for the target Web site, of which each Web page has been deleted. Further, the precache control unit 110 resets the point icon, of which the pattern is replaced with the image generated from the top page in step 610, to the original point icon determined depending on the point type or deletes the point icon displayed in step 608.

The second embodiment of the present invention has been described. A control unit 106 generates HTML document text containing a guidance image 300, as shown in FIG. 7B, including point icons using images generated from respective top pages as mentioned above in accordance with a user operation, and then transfers the generated HTML document text through an external terminal interface 112 to an external terminal 4 connected to the external terminal interface 112. In this instance, in the HTML document text, links to the Web site URLs contained in respective point records corresponding to the point icons are described in portions corresponding to the respective point icons (i.e., image parts which are obtained by slicing the guidance image 300 and corresponds to the respective point icons). Consequently, the user can view the guidance image 300 as shown in FIG. 7B using a Web browser of the external terminal 4, such as a PDA or a mobile phone. In addition, when the user selects one of the point icons in the guidance image 300, the user can access a Web site associated with a point corresponding to the selected point icon.

As mentioned above, according to the second embodiment, an image representing the top page of a Web site or an image included in the top page can be used as a point icon indicating a point or a facility on a map. The user selects a point icon to start viewing a Web page of a Web site associated with a point indicated by the selected point icon. Therefore, the usefulness and decorative design of a point icon can be improved.

A third embodiment of the present invention will now be described. According to the third embodiment, the precache starting process and the precaching process in the information system according to the first embodiment are replaced with a precache starting process, a precaching process, and an associated information presentation process shown in FIGS. 8A to 8C.

In a vehicle-mounted system 1 according to the third embodiment, a guidance image generation unit 107 generates a guidance image 300 including point icons in addition to a current position mark 302 representing a current vehicle position, a route graphic 303 representing a recommended route within a map display range, and a destination mark 304 representing a destination on a map image 301 representing an area surrounding the current vehicle position, and displays the generated image on a display 12 through a GUI control unit 103.

Figure 9A:
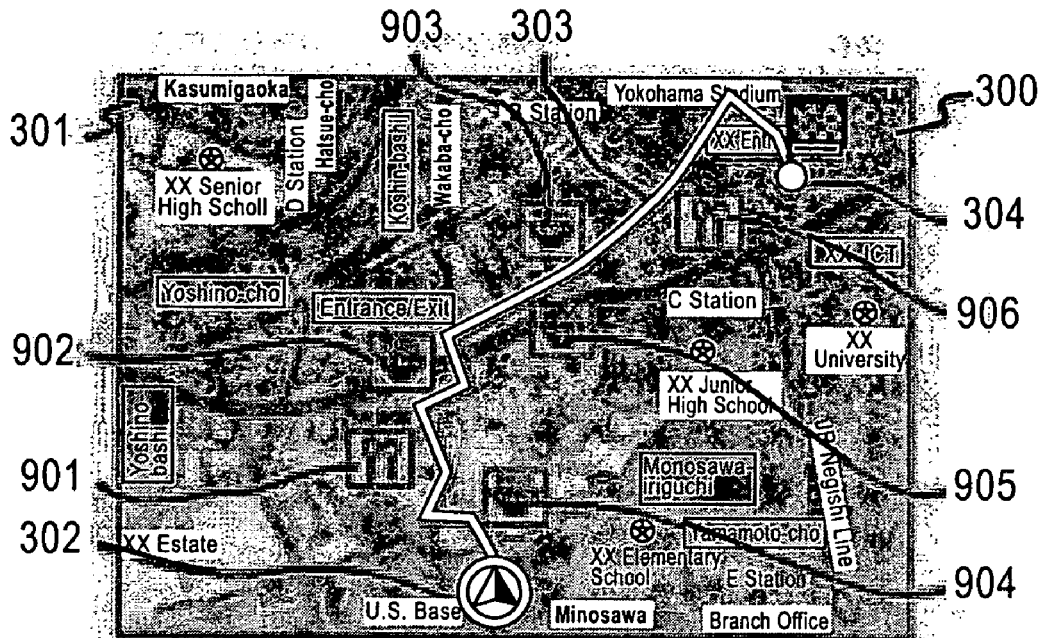
FIGS. 9A to 9C show examples displayed by the vehicle-mounted system according to the third embodiment of the present invention.

FIG. 9A shows an example of the guidance image 300 displayed on the display 12 as mentioned above. In this example, the guidance image generation unit 107 displays point icons of only the point records containing point coordinates in the vicinity of the recommended route and a point type "Restaurant" or "Ramen Restaurant" in accordance with user settings. As shown in FIG. 9A, point icons 901 and 906 of point records containing the point type "Restaurant" and point icons 902 to 905 of point records containing the point type "Ramen Restaurant" are displayed on the map image 301 serving as the guidance image 300.

The precache starting process, the precaching process, and the associated Web presentation process by a precache control unit 110 of the vehicle-mounted system 1 according to the third embodiment will now be described hereinbelow.

Figure 8A:
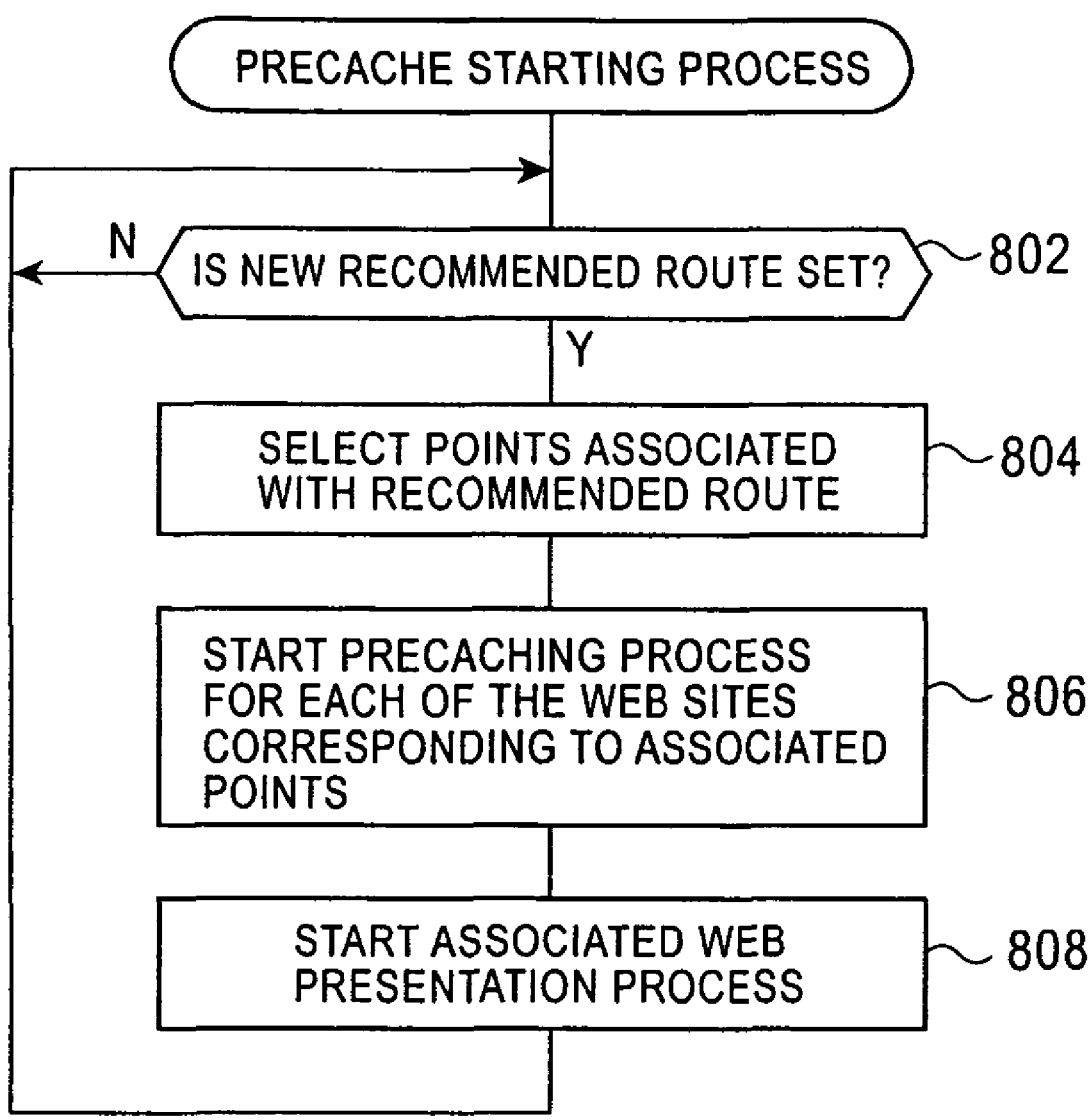
FIGS. 8A to 8C are flowcharts of processes executed by a vehicle-mounted system according to a third embodiment of the present invention.

First, the precache starting process will now be described. FIG. 8A shows a procedure of the precache starting process.

As shown in FIG. 8A, according to the precache starting process, whether a new recommended route is set in a memory 105 is monitored (step 802). If a new recommended route is set in the memory 105, point records containing the point coordinates of a point associated with the recommended route are selected with reference to the map data (step 804). For a point associated with the recommended route, a point having a point record containing point coordinates in the vicinity of the recommended route can be used. In addition, a point having a point record containing the point coordinates in the vicinity of the recommended route and further containing the point type set to be displayed as a point icon by the user can also be used. In this example, the points having point records containing point coordinates in the vicinity of the recommended route and also containing the point type "Restaurant" or "Ramen Restaurant" are selected.

The precaching process for each of the respective Web sites (target Web sites) specified by the Web site URLs contained in the selected point records is started for every selected point record (step 806). If the selected point record does not contain a Web site URL, the precaching process is not started. Subsequently, the associated Web presentation process for a set of target Web sites subjected to the started precaching process is started (step 808). After that, the process is returned to step 802 to monitor whether a new recommended route is set.

Figure 8B:
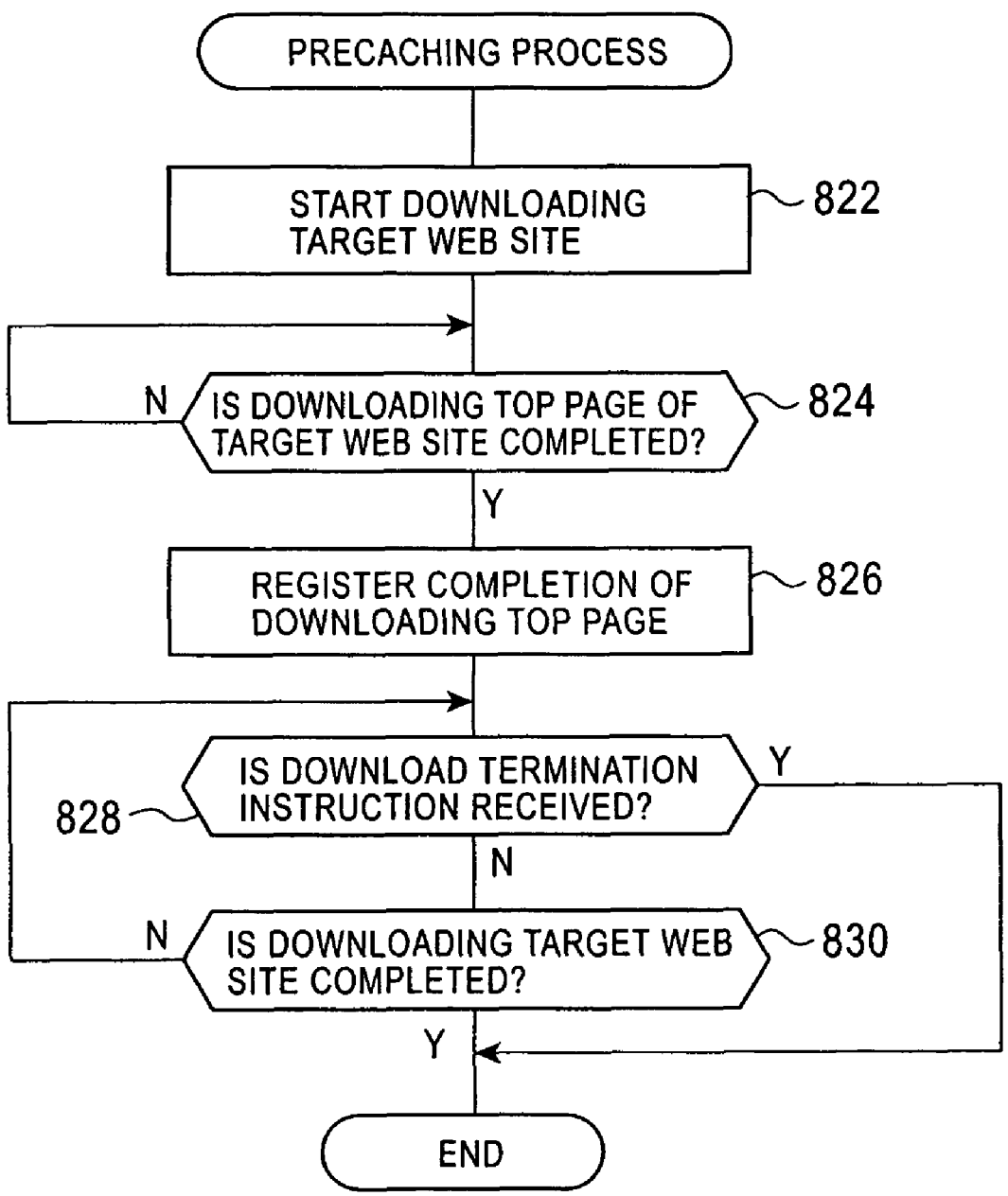

The precaching process started in step 806 for every point associated with the recommended route will now be described. FIG. 8B shows a procedure of the precaching process.

According to the process, as shown in FIG. 8B, the precache control unit 10 accesses a target Web site on a Web server 3 through a communication control unit 109 and a wireless communication device 13 over the Internet 2 to start downloading, e.g., each Web page of the target Web site (step 822). The process proceeds to step 824. If each Web page of the target Web site already has been downloaded in a page cache memory 111, the download is not started. The process skips to step 824. The target Web site is downloaded in a manner similar to the precaching process according to the first embodiment. Each downloaded Web page is stored in the page cache memory 111 such that the URL of a download source is related to the identification of the Web site to which the Web page belongs.

In step 824, it is determined whether downloading the top page of the target Web site is completed. When the top page of the target Web site is stored in the page cache memory 111, it is determined that the download of the top page is completed. Therefore, when the download is not started in step 822, it is immediately determined that the download of the top page of the target Web site is finished.

If downloading the top page of the target Web site is completed, the precache control unit 10 registers the completion of downloading the top page of the target Web site (step 826). The process is waiting for an event, i.e., whether a download termination instruction is received from the associated Web presentation process (step 828) or whether downloading each Web page of the target Web site is completed (step 830). Then, the process terminates.

In step 822, as an alternative, only the top page of the target Web site may be downloaded. In this case, steps 828 and 830 are omitted.

Figure 8C:
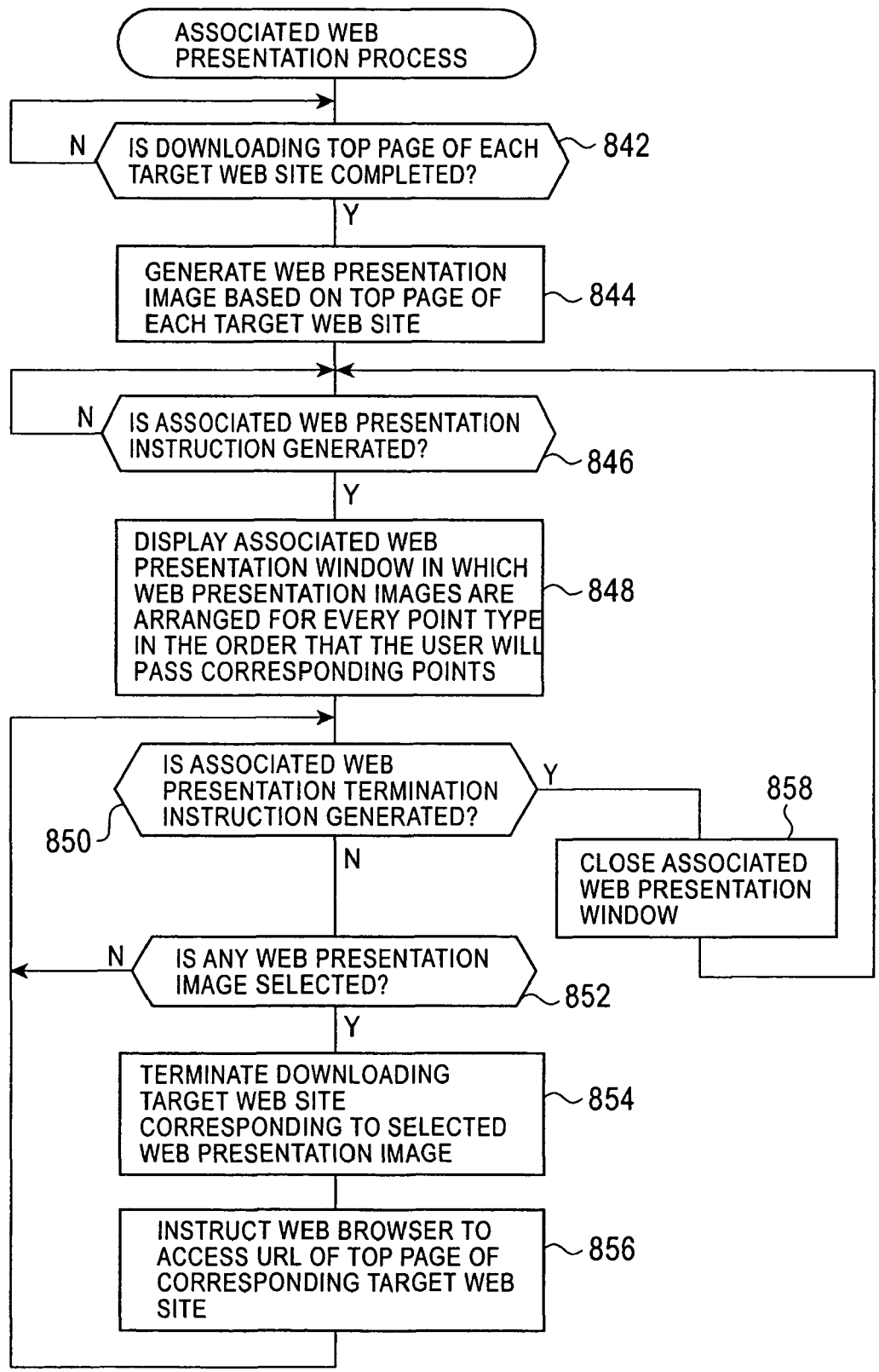

The associated Web presentation process will now be described. FIG. 8C shows a procedure of the associated Web presentation process.

As shown in FIG. 8C, the process is waiting until the completion of downloading of the top page of each target Web site subjected to the precaching process started in step 806 of the precache starting process is registered in step 826 of the precaching process (step 842).

If the completion of downloading of the top page of each target Web site is registered, a Web presentation image is generated on the basis of each top page registered as having download completed (step 844). The Web presentation image is generated in the same way as an image used as a point icon according to the second embodiment. In other words, an image of the whole or a part of the top page is scaled down to a predetermined Web presentation image size or an image which is included in the top page and satisfies a predetermined condition is scaled down to the predetermined Web presentation image size. The scaled-down image is used as a Web presentation image.

The process waits for an associated Web presentation instruction which is generated by a predetermined user operation (step 846). If the associated Web presentation instruction is generated, an associated Web presentation window is generated and is displayed on the display 12 through the GUI control unit 103 (step 848). In the associated Web presentation window, the Web presentation images generated in step 844 are arranged for every point type in the order that the user will pass the corresponding points as the user drives along the recommended route. In this case, a point corresponding to a Web presentation image is a point having a point record containing the Web site URL of the Web site, of which the top page serves as a source of the Web presentation image. The point type of the point is specified by the point type contained in the corresponding point record. The order of the point is determined based on the point coordinates contained in the corresponding point record and the recommended route stored in the memory 105. In this case, among the Web presentation images generated in step 844, the Web presentation images corresponding to the points closer to the destination than the current vehicle point may be arranged in the associated Web presentation window.

Figure 9B:
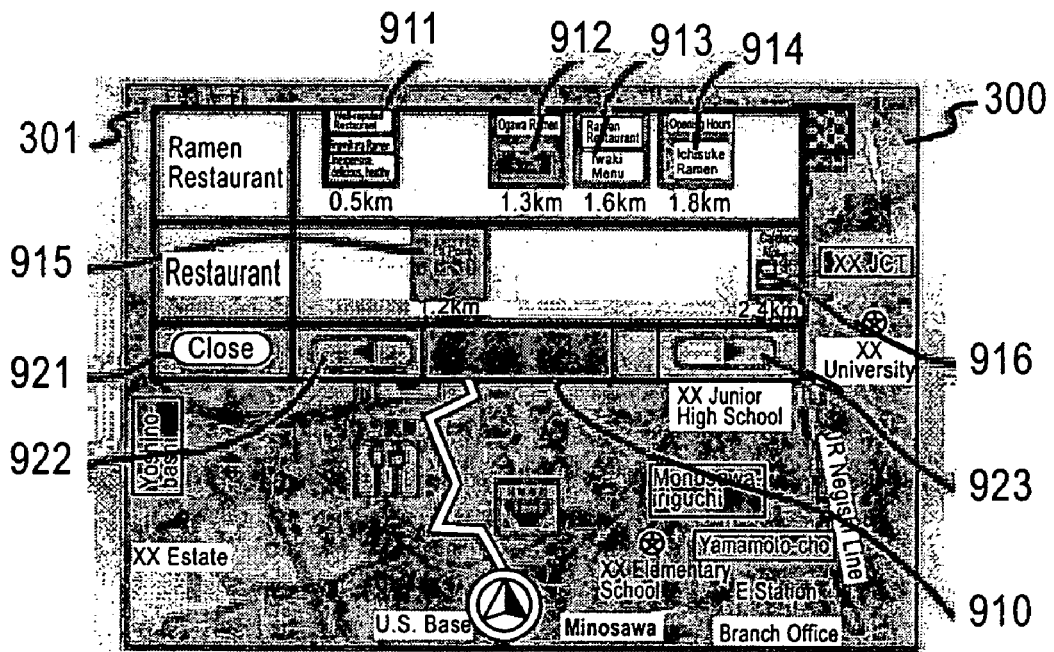

FIG. 9B includes such an associated Web presentation window displayed as mentioned above. As shown in FIG. 9B, in an associated Web presentation window 910, Web presentation images 911 to 916 generated from the respective top pages of the Web sites associated with the points in the vicinity of the recommended route are displayed for every point type (ramen restaurant and restaurant) in the order that the user will pass the corresponding points as the user drives along the recommended route. In the associated Web presentation window, a distance to each point is displayed below the corresponding Web presentation image. A distance is obtained as the length of a recommended route segment from the current vehicle position to a position on the recommended route nearest the corresponding point. Instead of or in addition to the distance, the estimated driving time required until the user will pass the corresponding point along the recommended route can be displayed.

The associated Web presentation window includes a "Close" button 921 to close the associated Web presentation window and scroll buttons 922 and 923 to scroll Web presentation image display areas. The Web presentation images 911 to 916 correspond to the points indicated by the point icons 904, 902, 905, 903, 901, and 906 in FIG. 9A, respectively.

Again referring to FIG. 8C, after the associated Web presentation window is displayed, whether an associated Web presentation termination instruction is generated by operating the "Close" button 921 (step 850) and whether any Web presentation image is selected in the associated Web presentation window (step 852) are monitored.

If the associated Web presentation termination instruction is generated, the associated Web presentation window is closed (step 858). The process is returned to step 846 and waits for the next associated Web presentation instruction.

On the other hand, if any Web presentation image is selected (step 852), terminating the download is instructed to the precaching process for the Web site having the top page, on which the selected Web presentation image is based (step 854). If a Web browser 108 is not activated, the Web browser 108 is started. The URL of the top page on which the selected Web presentation image is based is specified to the Web browser 108, thus displaying the top page (step 856). The process is returned to step 850 to monitor whether an associated Web presentation termination instruction is generated (step 850) and whether any Web presentation image is selected in the associated Web presentation window (step 852).

Figure 9C:
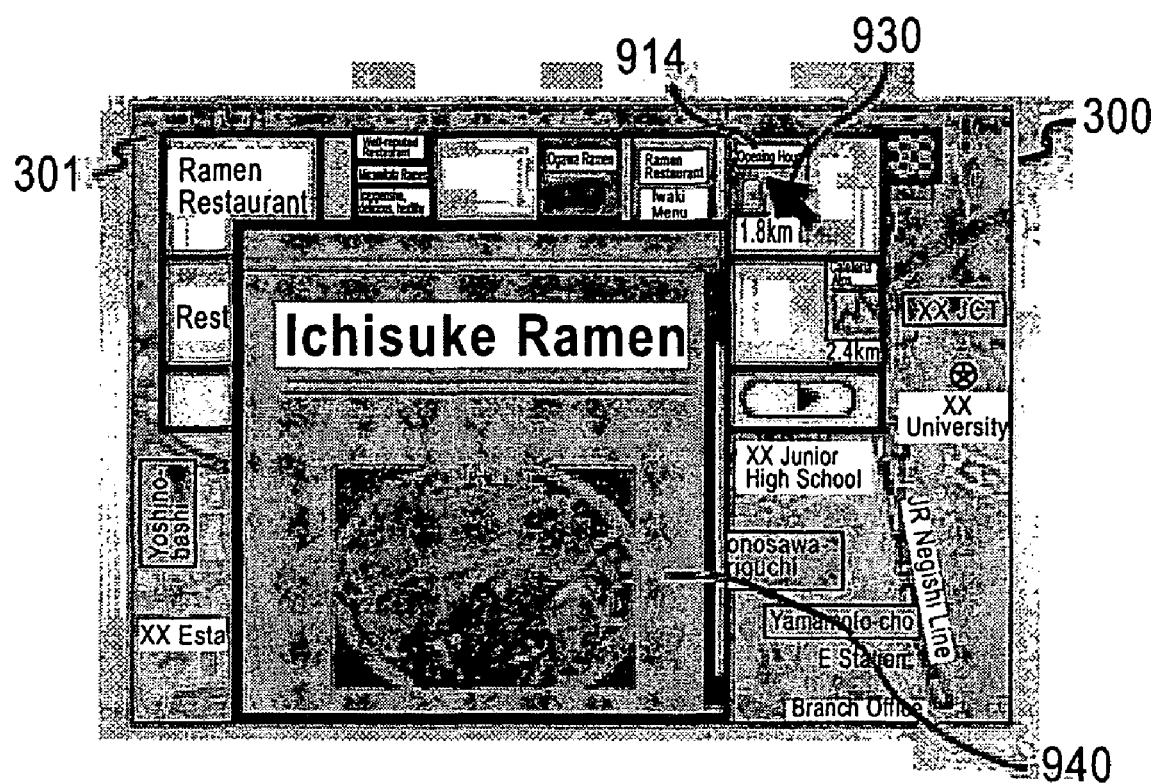

FIG. 9C shows a Web page displayed by the Web browser 108 as mentioned above. In this example, in response to the user operation of selecting the Web presentation image 914 using a cursor 930, the Web browser 108 displays the top page of the Web site specified by the Web site URL in the point record of the point corresponding to the point icon 903 in a Web browser window 940 set on the guidance image 300 by the Web browser 108.

When the recommended route is canceled because, e.g., the user has arrived at the destination, the associated Web presentation process is terminated by a control unit 106. The associated Web presentation window is closed simultaneously with the termination of the associated Web presentation process.

A fourth embodiment of the present invention will now be described. According to the fourth embodiment, the associated Web presentation process according to the third embodiment is replaced with an associated Web presentation process shown in FIG. 10.

Referring to FIG. 10, this associated Web presentation process waits until the completion of downloading the top page of each target Web site subjected to the precaching process started in step 806 of the precache starting process is registered in step 826 of the precaching process (step 1002).

If the completion of downloading the top page of each target Web site is registered, a Web presentation image is generated based on each top page, of which the termination of download is registered. The generated Web presentation image is related to a point icon of the corresponding point (step 1004). The Web presentation image is generated in the same way as the third embodiment. The point corresponding to the Web presentation image is specified by the point record containing the Web site URL of the Web site having the top page, on which the Web presentation image is based.

Subsequently, an associated Web presentation window is generated and is displayed on a display 12 through a GUI control unit 103 (step 1006). In the associated Web presentation window, point information display areas are arranged. Each point information display area includes a graphic used as a point icon of the corresponding point which is associated with a recommended route and is selected in the precache starting process, and a Web presentation image generated based on a Web site specified by a point record of the point. The point information display areas are arranged in the order that the user will pass the respective corresponding points as the user drives along the recommended route. Regarding each point which is associated with the recommended route but has no Web presentation image, i.e., each recommended-route associated point of which the point record contains no Web site URL, the corresponding point information display area includes only the graphic used as a point icon. In addition, only the point information display areas regarding the respective points closer to the destination than the current vehicle position can be arranged in the associated Web presentation window. Upon starting the associated Web presentation process, information regarding the recommended-route associated points selected by the precache starting process is sent from the precache starting process to the associated Web presentation process.

Figure 11A:
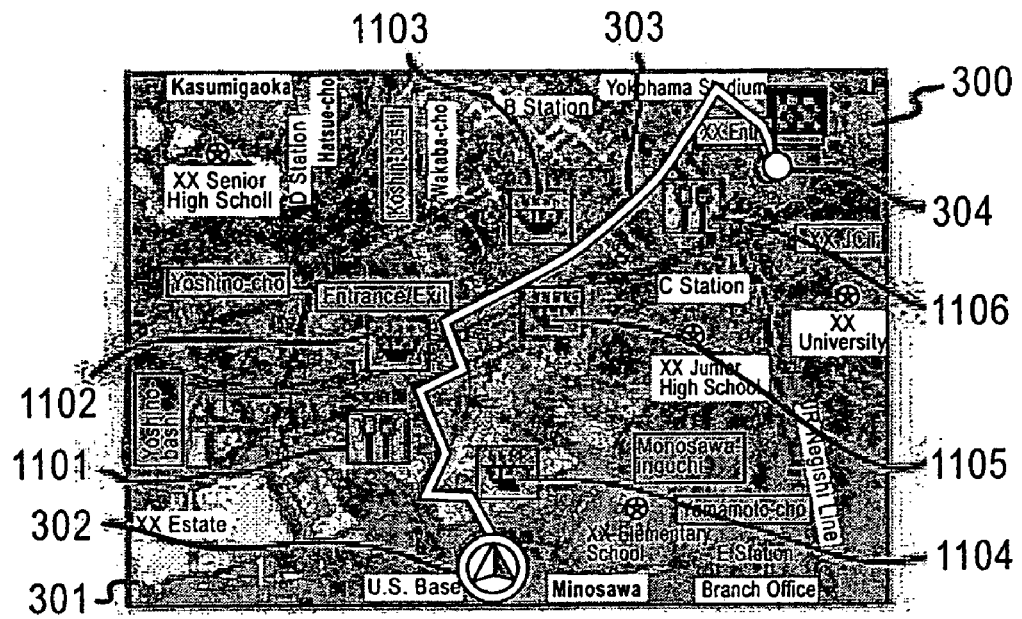
FIGS. 11A and 11B show examples displayed by the vehicle-mounted system according to the fourth embodiment of the present invention.
Figure 11B:
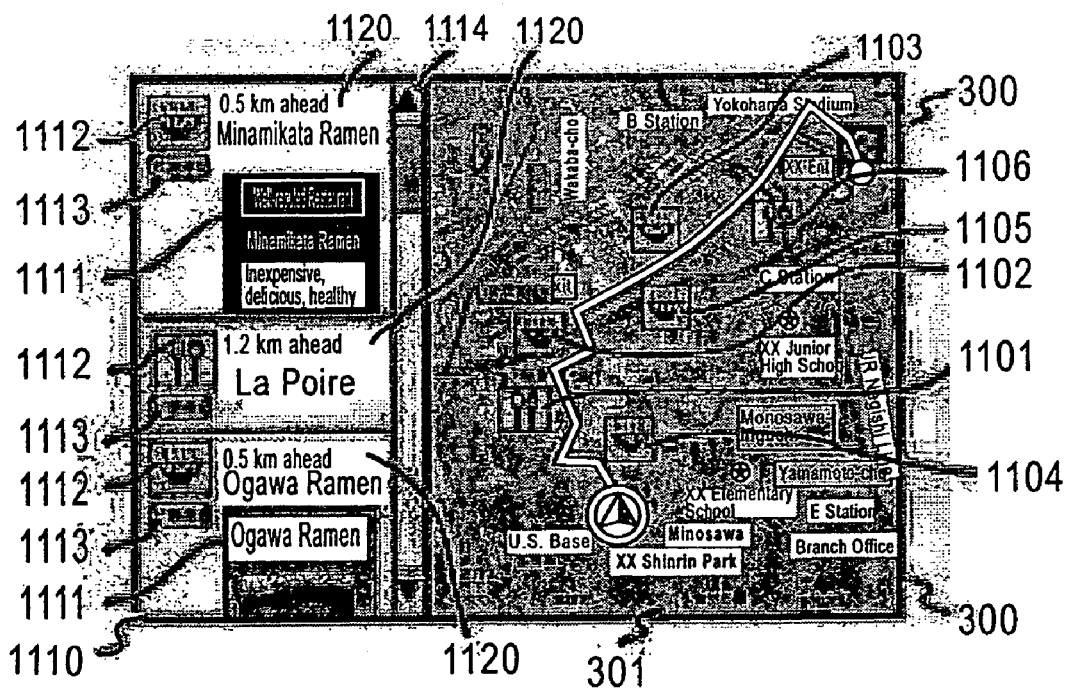

FIG. 11B includes an associated Web presentation window displayed as mentioned above. According to the fourth embodiment, when the associated Web presentation window is not displayed, the guidance image 300 is displayed on the entire screen of the display 12 as shown in FIG. 11A. When the associated Web presentation window is displayed, as shown in FIG. 11B, the screen of the display 12 is split into two segments. The guidance image 300 is displayed in one segment, and an associated Web presentation window 1110 is displayed in the other segment. Each of FIGS. 11A and 11B includes point icons 1101 to 1106.

The associated Web presentation window 1110 includes point information display areas 1120 corresponding to the respective points near the recommended route, the areas 1120 being arranged in the order that the user will pass the corresponding points along the recommended route. Each point information display area 1120 may include a Web presentation image 1111 generated based on the top page of the Web site associated with the corresponding point, a graphic 1112 used as a point icon related to the Web presentation image, and a "Location" button 1113. In each point information display area 1120, a distance to the corresponding point and the point name contained in the point record of the point are displayed. Instead of or in addition to the distance, estimated driving time required until the user will pass the corresponding point along the recommended route can be displayed.

The associated Web presentation window 1110 includes a scroll bar 1114 to scroll up or down the point information display areas 1120.

Again referring to FIG. 10, after the associated Web presentation window is displayed (step 1006), whether any of the point icons 1101 to 1106 on the guidance image 300 is selected (step 1008), whether the "Location" button 1113 is selected (step 1012), and whether any of the Web presentation images 1111 is selected (step 1016) are monitored.

Figure 12A:
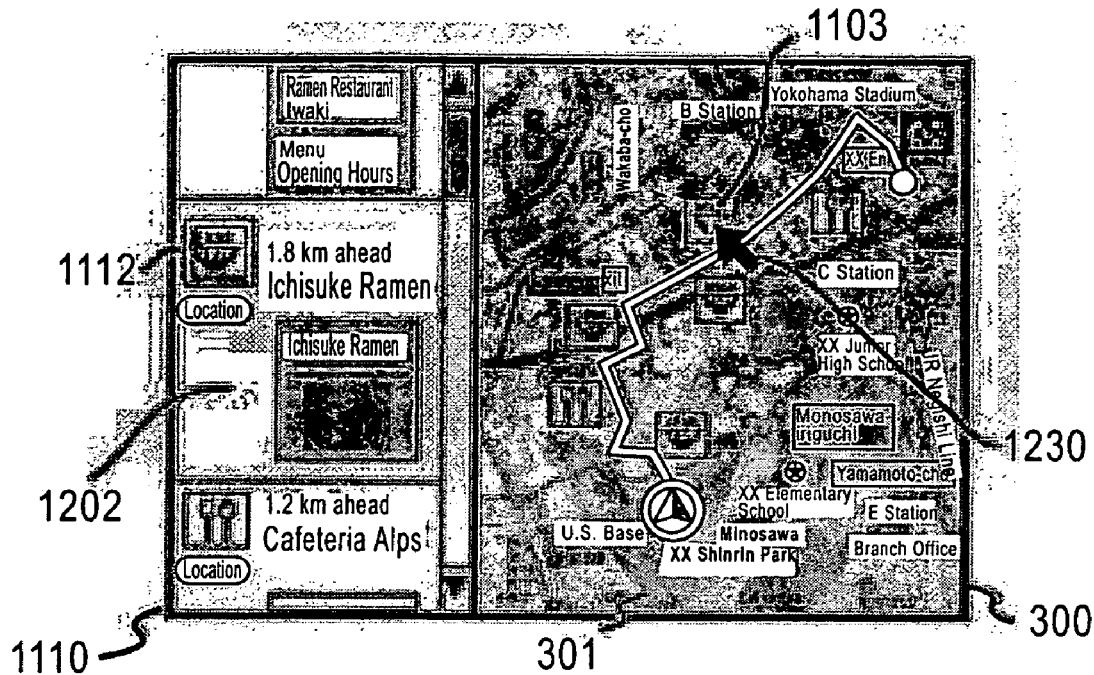
FIGS. 12A to 12D show examples displayed by the vehicle-mounted system according to the fourth embodiment of the present invention.

If any of the point icons 1101 to 1106 on the guidance image 300 is selected (step 1008), the associated Web presentation window 1110 is scrolled up or down such that the point information display area 1120 regarding the point corresponding to the selected point icon is displayed in the middle of the associated Web presentation window 1110 (step 1010). For example, if the point icon 1103 of the point for which the point name is "Ichisuke Ramen" is selected by a cursor 1230 as shown in FIG. 12A, the associated Web presentation window 1110 is scrolled such that a point information display area 1202 regarding the point corresponding to the selected point icon 1103 is displayed in the middle of the associated Web presentation window 1110. At that time, the graphic 1112 of the point icon in the point information display area 1202 regarding the point having the point name "Ichisuke Ramen" is highlighted until the next user operation is performed.

Figure 12B:
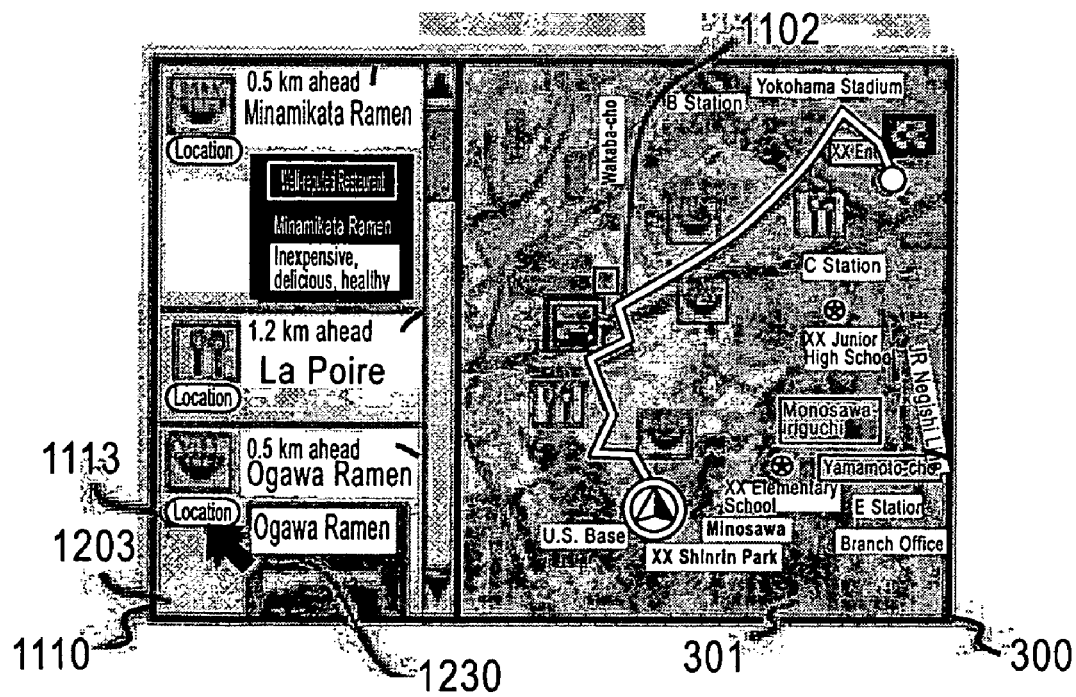

Subsequently, if any "Location" button 1113 is selected (step 1012), the point icon of the point corresponding to the point information display area 1120 including the selected "Location" button 1113 is highlighted (step 1014). For example, as shown in FIG. 12B, if the "Location" button 1113 in a point information display area 1203 regarding the point having the point name "Ogawa Ramen" is operated using the cursor 1230, the point icon 1102 of this point is highlighted.

If any Web presentation image 1111 is selected (step 1016), terminating the download is instructed to the precaching process for the Web site having the top page on which the selected Web presentation image is based (step 1018). If a Web browser 108 is not activated, the Web browser 108 is started. The URL of the top page on which the selected Web presentation image is based is specified to the Web browser 108, thus displaying the top page (step 1020). The process is then returned to step 1008. Step 1008 and the subsequent steps are executed to monitor whether any point icon in the guidance image 300 is selected (step 1008), whether any "Location" button 1113 is selected (step 1012), and whether any Web presentation image 1111 is selected (step 1016).

Figure 12C:
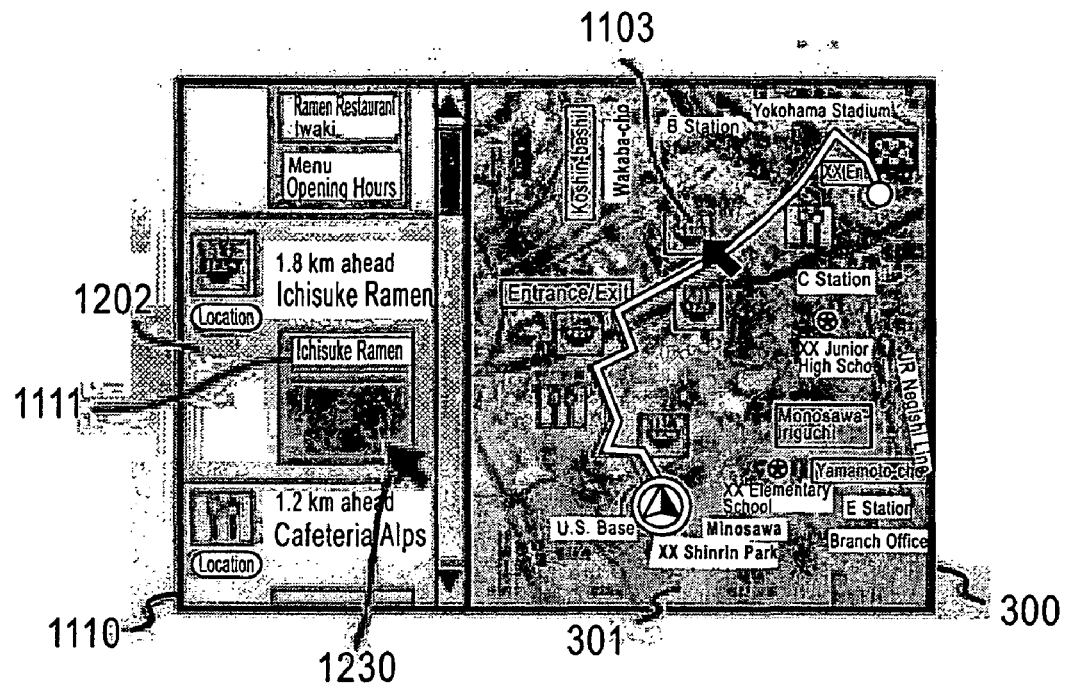
Figure 12D:
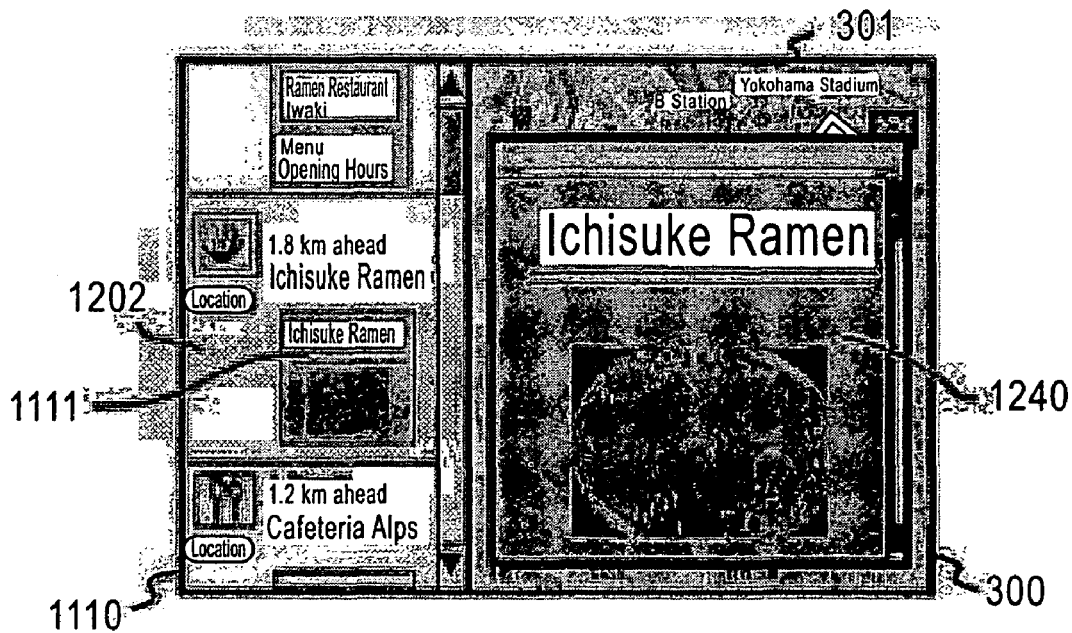

FIG. 12D includes a Web page displayed by the Web browser 108 as mentioned above. In the example of FIG. 12D, when the user selects the Web presentation image 1111 using the cursor 1230 as shown in FIG. 12C, the Web browser 108 displays the top page of the Web site specified by the Web site URL in the point record of the point corresponding to the point icon 1103 in a Web browser window 1240 set on the guidance image 300.

According to the third and fourth embodiments, the user can immediately grasp the types of listed points along a recommended route and the order thereof from Web presentation images displayed in the associated Web presentation window 910 or 1110 and use such information to make a driving plan. In addition, the user can view a Web site which provides information related to a point by simply selecting a Web presentation image associated with the point, so that the user can obtain more detailed information regarding the point.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle-mounted apparatus comprising:

a navigation unit configured to display a map to provide route guidance information to a user on the displayed map;

a Web browser configured to access a Web page to display the Web page;

a first storage unit configured to store point information blocks assigned to respective points, each point information block containing point coordinates indicating the geographical coordinates of the corresponding point and the URL of a Web site which provides information associated with the point such that the coordinates are related to the Web site URL;

a page memory configured to save Web pages of the Web sites;

a controller configured to access the Web site associated with each point matching a predetermined condition among the points, which have the point information blocks stored in the first storage unit, using the Web site URL contained in the corresponding point information block via wireless communication to download at least one Web page of the Web site to the page memory, and to display a mark at a position corresponding to the point coordinates contained in the point information block which also contains the URL of the Web site, of which the at least one Web page is being or has been downloaded, on the map displayed by the navigation unit and, in response to a user operation on the mark, allowing the Web browser to access the Web page, downloaded in the page memory, of the Web site corresponding to the operated mark; and a display configured to change the pattern of each mark displayed on the map depending on the progress of downloading the at least one Web page of the Web site corresponding to the mark.

2. The apparatus according to claim 1, wherein the controller further includes a second storage unit, monitors whether a new recommended route is set in the second storage unit, and when the new recommended route is set in the second storage unit, selects points associated with the recommended route from among the points, of which the point information blocks are stored in the first storage unit, with reference to map data.

3. The apparatus according to claim 2, wherein the points associated with the recommended route are located in the vicinity of at least one of a destination and the recommended route.

4. The apparatus according to claim 2, wherein
points associated with the Web sites, of which the at least one Web page is not downloaded to the page memory, are extracted from the selected points, the Web sites associated with the extracted points are set to target Web sites, and a process for the target Web site is performed for every extracted point.

5. The apparatus according to claim 4, wherein in downloading each target Web site, the top page of the target Web site specified by the Web site URL is preferentially downloaded as a target Web page.

6. The apparatus according to claim 1, wherein the pattern of the mark of each displayed target Web site changes depending on the percentage of download completed.

7. A vehicle-mounted apparatus comprising:
a navigation unit configured to display a map to provide route guidance information to a user on the displayed map;
a Web browser configured to access a Web page to display the Web page;
a storage unit configured to store point information blocks assigned to respective points, each point information block containing point coordinates indicating the geographical coordinates of the corresponding point and the URL of a Web site, which provides information associated with the point, such that the coordinates are related to the Web site URL;
a page memory configured to save Web pages of the Web sites;
a controller configured to access the Web site associated with each point matching a predetermined condition among the points, which have the point information blocks stored in the storage unit, using the Web site URL contained in the corresponding point information block via wireless communication to download at least one Web page of the Web site to the page memory, and to display a mark at a position corresponding to the point coordinates contained in the point information block which also contains the URL of the Web site, of which the at least one Web page is being or has been downloaded, on the map displayed by the navigation unit and, in response to a user operation on the mark, allowing the Web browser to access the Web page, downloaded in the page memory, of the Web site corresponding to the operated mark; and
a display configured to display an image in the vicinity of each mark displayed on the map, at a position associated with each mark on the map, the image representing at least part of the Web page of the Web site corresponding to each mark or content included in the Web page.

8. The apparatus according to claim 7, wherein the Web page of the Web site corresponding to each mark is the top page thereof.

9. A vehicle-mounted apparatus comprising:
a navigation unit configured to display a map to provide route guidance information to a user on the displayed map;
a Web browser configured to access a Web page to display the Web page;
a storage unit configured to store point information blocks assigned to respective points, each point information block containing point coordinates indicating the geographical coordinates of the corresponding point and the URL of a Web site, which provides information associated with the point, such that the coordinates are related to the Web site URL;
a page memory configured to save Web pages of the Web sites;
a controller configured to access the Web site associated with each point matching a predetermined condition among the points, which have the point information blocks stored in the storage unit, using the Web site URL contained in the corresponding point information block via wireless communication to download at least one Web page of the Web site to the page memory, and to display a mark at a position corresponding to the point coordinates contained in the point information block which also contains the URL of the Web site, of which the at least one Web page is being or has been downloaded, on the map displayed by the navigation unit and, in response to a user operation on the mark, allowing the Web browser to access the Web page, downloaded in the page memory, of the Web site corresponding to the operated mark; and
a display configured to concurrently display information extracted from the Web page of the Web site corresponding to each mark in the vicinity of each mark displayed on the map, at a position associated with each mark on the map.

10. The apparatus according to claim 9, wherein the information extracted from the Web page of the Web site corresponding to each mark indicates a point icon, and an image obtained by scaling down an image of at least part of the top page of the Web site is used as the point icon.

11. A vehicle-mounted apparatus comprising:
a navigation unit configured to display a map to provide route guidance information to a user on the displayed map;
a Web browser configured to access a Web page to display the Web page;
a storage unit configured to store point information blocks assigned to respective points, each point information block containing point coordinates indicating the geographical coordinates of the corresponding point and the URL of a Web site, which provides information associated with the point, such that the coordinates are related to the Web site URL;
a page memory configured to save Web pages of the Web sites;
a controller configured to access a the Web site associated with each point matching a predetermined condition among the points, which have the point information blocks stored in the storage unit, using the Web site URL contained in the corresponding point information block via wireless communication to download at least one Web page of the Web site to the page memory, to display a mark at a position corresponding to the point coordinates contained in the point information block which also contains the URL of the Web site, of which the at least one Web page is being or has been downloaded, on the map displayed by the navigation unit and, in response to a user operation on the mark, allowing the Web browser to access the Web page, downloaded in the page memory, of the Web site corresponding to the operated mark, and for searching the Web pages stored in the page memory for a Web page having a description matching a search keyword specified by the user and making the display pattern of the mark corresponding to the Web site, which the matched Web page belongs to, different from those of the other marks.

12. A vehicle-mounted apparatus comprising:

a navigation unit configured to display a map to provide route guidance information to a user on the displayed map;

a Web browser configured to access a Web page to display the Web page;

a storage unit configured to store point information blocks assigned to respective points, each point information block containing point coordinates indicating the geographical coordinates of the corresponding point and the URL of a Web site, which provides information associated with the point, such that the coordinates are related to the Web site URL; and a controller configured to perform the operations of:

setting each point matching a predetermined condition as a target point among the points having the point information blocks stored in the storage unit, and accessing the Web site associated with each target point using the Web site URL contained in the corresponding point information block via wireless communication to obtain a Web page of the Web site and generate an icon representing an image of at least part of the obtained Web page or content included in the Web page such that the icon is linked to the Web site URL contained in the point information block of the target point;

displaying the generated icon corresponding to each target point near a position specified by the point coordinates contained in the point information block of the target point on the map displayed by the navigation unit; and in response to a user operation on the displayed icon, allowing the Web browser to access the Web page specified by the Web site URL linked to the operated icon.

13. The apparatus according to claim 12, wherein the navigation unit searches a recommended route to a destination set by the user and displays the map and the recommended route thereon, and the point information block of each point matching the predetermined condition contains the point coordinates along or in the vicinity of the recommended route.

14. The apparatus according to claim 12, wherein the navigation unit displays a registered point mark at a position corresponding to the point coordinates contained in each of the point information blocks of the respective points, the point information blocks being stored in the storage unit.

15. A vehicle-mounted apparatus comprising:

a navigation unit configured to search a recommended route to a destination set by a user to display a map and the recommended route on the map;

a Web browser configured to access a Web page to display the Web page;

a storage unit configured to store point information blocks regarding respective points, each point information block including point coordinates indicating the geographical coordinates of the corresponding point and the URL of a Web site, which provides information associated with the point, such that the coordinates are related to the Web site URL; and a controller configured to perform the operations of:

setting each point, which has the point information block containing the point coordinates along or in the vicinity of the searched recommended route, as a target point among the points having the point information blocks stored in the storage unit, and accessing the Web site associated with each target point using the Web site URL contained in the corresponding point information block via wireless communication to obtain a Web page of the Web site and generate an icon representing an image of at least part of the obtained Web page or content included in the Web page such that the icon is linked to the Web site URL contained in the point information block of the target point;

displaying an icon arrangement window in which the generated icons corresponding to the respective target points are arranged in the order that the user passes the corresponding points when the user drives along the recommended route; and in response to a user operation on one of the icons in the displayed icon arrangement window, allowing the Web browser to access the Web page specified by the Web site URL linked to the operated icon.

16. The apparatus according to claim 15, wherein each point information block contains point type information representing the type of the corresponding point, and the controller classifies the generated icons under the point types and arranges the classified icons in the icon arrangement window.

17. The apparatus according to claim 15, wherein the controller displays a distance to each target point or expected driving time required until the user passes the corresponding point along the recommended route in addition to each icon arranged in the icon arrangement window.

18. A method for supporting the use of a Web site in a vehicle-mounted apparatus having a navigation unit for searching a route to a destination set by a user to determine a recommended route and displaying a map and the recommended route on the map and a Web browser for accessing a Web page to display the Web page, the method comprising the steps of:

when the navigation unit determines a recommended route, setting each point located along or in the vicinity of the recommended route as a target point on the basis of previously stored point information blocks, which are assigned to respective points and which each contain the point coordinates indicating the geographical coordinates of the corresponding point and the URL of a Web site, which provides information associated with the point, such that the coordinates are related to the Web site URL, and accessing the Web site associated with each target point using the Web site URL via wireless communication to obtain a Web page of the Web site and generate an icon representing an image of at least part of the obtained Web page or content included in the Web page such that the icon is linked to the Web site URL;

displaying the generated icons corresponding to the target points at respective positions specified by the point coordinates, contained in the point information blocks of the target points, on the map displayed by the navigation unit; and in response to a user operation on one of the displayed icons, allowing the Web browser to access a Web page specified by the Web site URL linked to the operated icon.

19. A method for supporting the use of a Web site in a vehicle-mounted apparatus having a navigation unit for searching a route to a destination set by a user to determine a recommended route and displaying a map and the recommended route on the map and a Web browser for accessing a Web page to display the Web page, the method comprising the steps of:

when the navigation unit determines a recommended route, setting each point located along or in the vicinity of the recommended route as a target point on the basis of previously stored point information blocks, which are assigned to respective points and which each contain the point coordinates indicating the geographical coordinates of the corresponding point and the URL of a Web site, which provides information associated with the point, such that the coordinates are related to the Web site URL, and accessing the Web site associated with each target point using the Web site URL via wireless communication to obtain a Web page of the Web site and generate an icon representing an image of at least part of the obtained Web page or content included in the Web page such that the icon is linked to the Web site URL;

displaying an icon arrangement window in which the generated icons corresponding to the respective target points are arranged in the order that the user passes the points when the user drives along the recommended route; and in response to a user operation on one of the icons in the icon arrangement window, allowing the Web browser to access a Web page specified by the Web site URL linked to the operated icon.

* * * * *